(12) United States Patent
Hammerschmidt et al.

(10) Patent No.: US 11,287,338 B2
(45) Date of Patent: Mar. 29, 2022

(54) TORQUE MEASUREMENT USING MILLIMETER-WAVE METAMATERIAL

(71) Applicant: Infineon Technologies AG, Neubiberg (DE)

(72) Inventors: Dirk Hammerschmidt, Finkenstein (AT); Christof Michenthaler, Arnoldstein (AT)

(73) Assignee: Infineon Technologies AG

( * ) Notice: Subject to any disclaimer, the term of this patent is extended or adjusted under 35 U.S.C. 154(b) by 236 days.

(21) Appl. No.: 16/591,806

(22) Filed: Oct. 3, 2019

(65) Prior Publication Data

US 2021/0102853 A1 Apr. 8, 2021

(51) Int. Cl.
*G01L 3/10* (2006.01)
*G01L 3/14* (2006.01)

(52) U.S. Cl.
CPC .............. *G01L 3/105* (2013.01); *G01L 3/109* (2013.01); *G01L 3/14* (2013.01)

(58) Field of Classification Search
None
See application file for complete search history.

(56) References Cited

U.S. PATENT DOCUMENTS

| | | | | |
|---|---|---|---|---|
| 7,538,946 B2* | 5/2009 | Smith | ................ | H01Q 15/0086 359/569 |
| 8,015,886 B2* | 9/2011 | Lohr | ..................... | G01L 3/1428 73/862.338 |
| 8,024,956 B2* | 9/2011 | Hammerschmidt | .... | G01P 3/488 73/1.11 |
| 8,421,446 B2* | 4/2013 | Straubinger | ......... | G01D 5/2225 324/207.15 |
| 9,026,378 B2* | 5/2015 | Fericean | ................. | G01L 3/105 702/41 |
| 10,035,535 B2* | 7/2018 | Ohira | ..................... | G01D 5/244 |
| 10,749,612 B1* | 8/2020 | Iannotti | ............... | H04B 5/0031 |
| 10,866,152 B2* | 12/2020 | Hammerschmidt | ...... | G01L 3/00 |
| 2006/0144166 A1* | 7/2006 | Ruehl | ..................... | G01L 3/105 73/862.331 |
| 2007/0024387 A1* | 2/2007 | Sandacci | ................ | G01D 5/243 333/24 R |
| 2008/0116883 A1* | 5/2008 | Ruehl | .................. | G01D 5/2093 324/207.17 |
| 2009/0217774 A1* | 9/2009 | Sills | ........................ | G01L 5/221 73/862.193 |
| 2009/0314104 A1* | 12/2009 | Lohr | ..................... | G01L 3/1428 73/862.338 |
| 2018/0154926 A1* | 6/2018 | Ohira | ..................... | G01D 5/244 |
| 2019/0376858 A1* | 12/2019 | Hammerschmidt | .. | G01L 3/1435 |
| 2021/0033703 A1* | 2/2021 | Hammerschmidt | ... | G01D 5/244 |

* cited by examiner

*Primary Examiner* — Freddie Kirkland, III
(74) *Attorney, Agent, or Firm* — Design IP

(57) ABSTRACT

A method of determining a torque applied to a rotatable shaft is provided. The method includes transmitting a first electro-magnetic transmit signal towards a first mutually coupled structure mechanically coupled to the rotatable shaft, converting, by the first mutually coupled multitrack structure, the first electro-magnetic transmit signal into a first electro-magnetic receive signal; receiving the first electro-magnetic receive signal; evaluating the received first electro-magnetic receive signal; and determining the torque applied to the rotatable shaft based on the evaluated first electro-magnetic receive signal.

30 Claims, 15 Drawing Sheets

TORQUE MEASUREMENT USING MILLIMETER-WAVE METAMATERIAL

FIELD

The present disclosure relates generally to a torque measurement system and to methods for measuring torque of a rotatable object.

BACKGROUND

Vehicles feature numerous safety, body, and powertrain applications that rely on speed sensing, position sensing, and/or angle sensing, as well as torque measurements. For example, in a vehicle's Electronic Stability Program (EPS), magnetic angle sensors and linear Hall sensors can be used to measure steering angle and steering torque. Modern powertrain systems can rely on magnetic speed sensors for camshaft, crankshaft and transmission applications, along with automotive pressure sensors, to achieve required $CO_2$ targets and smart powertrain solutions. However, a disadvantage of known solutions is that they are sensitive to magnetic disturbances.

Magnetic disturbance fields are prevalent in vehicles such that magnetic angle-measurements often have to endure harsh environments. This is especially problematic in hybrid and electric vehicles, where many wires with high currents are located near the sensor system. Thus, external magnetic disturbance fields may be generated by current-rails in a vehicle that influence the accuracy of the magnetic angle measurements. Thus, a torque measurement sensor that is robust against electromagnetic stray fields may be desirable.

SUMMARY

Embodiments provide a torque measurement system that includes a first rotatable carrier structure mechanically coupled to a rotational shaft and configured to rotate about a rotational axis in a rotation direction; a second rotatable carrier structure mechanically coupled to the rotational shaft and configured to rotate about the rotational axis in the rotation direction, where the second rotatable carrier structure is spaced apart from the first rotatable carrier structure; a first metamaterial track coupled to the first rotatable carrier structure, where the first metamaterial track is arranged outside of the rotational axis, and where the first metamaterial track comprises a first array of elementary structures; a second metamaterial track coupled to the second rotatable carrier structure, where the second metamaterial track is arranged outside of the rotational axis, and where the second metamaterial track comprises a second array of elementary structures. The first metamaterial track and the second metamaterial track are mutually coupled to each other by a first torque dependent coupling, thereby forming a first mutually coupled structure. The torque measurement system further includes at least one transmitter configured to transmit a first electro-magnetic transmit signal towards the first mutually coupled structure, where the first mutually coupled structure is arranged to convert the first electro-magnetic transmit signal into a first electro-magnetic receive signal based on a torque applied to the rotational shaft; and at least one receiver configured to receive the first electro-magnetic receive signal.

Embodiments provide a method of determining a torque applied to a rotatable shaft is provided. The method includes transmitting a first electro-magnetic transmit signal towards a first mutually coupled structure mechanically coupled to the rotatable shaft, converting, by the first mutually coupled multitrack structure, the first electro-magnetic transmit signal into a first electro-magnetic receive signal; receiving the first electro-magnetic receive signal; evaluating the received first electro-magnetic receive signal; and determining the torque applied to the rotatable shaft based on the evaluated first electro-magnetic receive signal.

BRIEF DESCRIPTION OF THE DRAWINGS

Embodiments are described herein making reference to the appended drawings.

DETAILED DESCRIPTION

Figure 1:
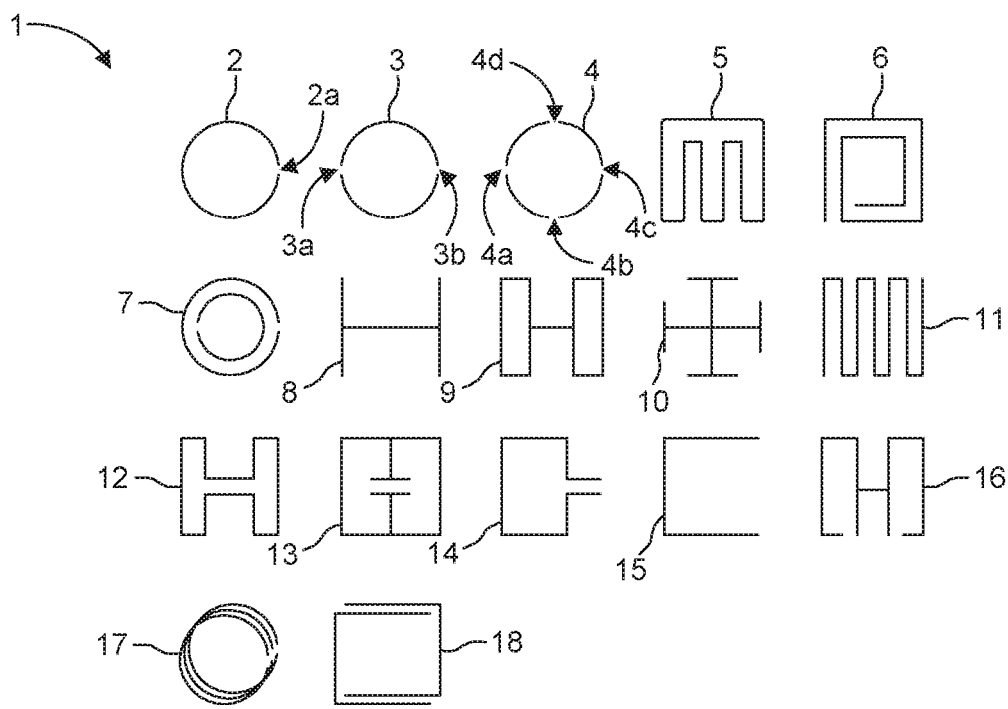
FIG. 1 illustrates a plurality of possible elementary structures according to one or more embodiments.

In the following, various embodiments will be described in detail referring to the attached drawings. These embodiments are given for illustrative purposes only and are not to be construed as limiting. For example, while embodiments may be described as comprising a plurality of features or elements, in other embodiments, some of these features or elements may be omitted, and/or may be replaced by alternative features or elements. In other embodiments, further features or elements in addition to those explicitly shown or described may be provided. In addition, features of the different embodiments described hereinafter may be combined with each other to form further embodiments, unless specifically noted otherwise. For example, variations or modifications described with respect to one of the embodiments may also be applicable to other embodiments unless noted to the contrary.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. Functional blocks may be implemented in hardware, firmware, software, or a combination thereof.

Embodiments relate to sensors and sensor systems, and to obtaining information about sensors and sensor systems. A sensor may refer to a component which converts a physical quantity to be measured to an electric signal, for example, a current signal or a voltage signal. In general, a physical quantity may for example comprise a magnetic field, an electric field, radio waves, a pressure, a force, a current or a voltage, but is not limited thereto. A sensor device, as described herein, may be an angle sensor, a linear position sensor, a speed sensor, a motion sensor, and the like.

The sensor circuit may be referred to as a signal processing circuit and/or a signal conditioning circuit that receives one or more signals (i.e., sensor signals) from one or more sensor elements in the form of raw measurement data and derives, from the sensor signal, a measurement signal that represents the physical quantity.

It will be appreciated that the terms "sensor", "sensor element", and "sensing element" may be used interchangeably throughout this description, and the terms "sensor signal" and "measurement signal" may also be used interchangeably throughout this description.

Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a sensor output suitable for processing after conditioning.

Thus, the sensor circuit may include an analog-to-digital converter (ADC) that converts the analog signal from the one or more sensor elements to a digital signal. The sensor circuit may also include a digital signal processor (DSP) that performs some processing on the digital signal. Therefore, the sensor package may include a circuit that conditions and amplifies the small signal of the sensor element via signal processing and/or conditioning.

A sensor device, as used herein, may refer to a device which includes a sensor and sensor circuit as described above. A sensor device may be integrated on a single semiconductor die (e.g., silicon die or chip), although, in other embodiments, a plurality of dies may be used for implementing a sensor device. Thus, the sensor and the sensor circuit are disposed on either the same semiconductor die or on multiple dies in the same package. For example, the sensor might be on one die and the sensor circuit on another die such that they are electrically connected to each other within the package. In this case, the dies may be comprised of the same or different semiconductor materials, such as GaAs and Si, or the sensor might be sputtered to a ceramic or glass platelet, which is not a semiconductor.

Embodiments are discussed below in the context of a millimeter wave (mm-wave) sensor and mm-wave systems that include a mm-wave transmitter, a mm-wave receiver, and/or a mm-wave transceiver. Mm-waves are radio waves designated in the band of radio frequencies in the electromagnetic spectrum from 30 to 300 gigahertz (GHz) and may also be used as radar waves. Thus, a mm-wave sensor, system, transmitter, receiver, or transceiver described herein may also be regarded to as a radar sensor, system, transmitter, receiver, or transceiver, and a mm-wave may be regarded to as a radar signal. It should be noted, however, that the embodiments may also be applied in applications different from radar such as, for example, radio frequency (RF) transmitters, receivers, or transceivers of RF communication devices. In fact, any RF circuitry may take advantage of the concepts described herein. A mm-wave sensor or mm-wave system may be configured as an angle sensor, a linear position sensor, a speed sensor, a motion sensor, and the like.

A metamaterial is a material engineered to have a property that is not found in naturally occurring materials. They are made from assemblies of multiple structural elements fashioned from composite materials such as metals or plastics. The materials may be arranged in repeating or periodic patterns, at scales that are smaller than the wavelengths of the phenomena they influence. In other words, metamaterials attain the desired effects by incorporating structural elements of sub-wavelength sizes, i.e., features which are actually smaller than the wavelength of the electromagnetic waves that they affect.

As a result, metamaterials derive their properties not necessarily from the properties of the base materials, but from their designed structures. Their precise shape, geometry, size, orientation, and arrangement of the structural elements gives the metamaterials their smart properties capable of manipulating electromagnetic waves: by blocking, reflecting, absorbing, enhancing, or bending waves, to achieve benefits. Thus, a metamaterial is defined as an artificial composite that gains its electrical properties from its exactingly-designed structures and their arrangement rather than inheriting them directly from which the materials it is composed.

A metamaterial may be a subset of a larger group of heterogeneous structures consisting of a base solid material and elements of a different material. The distinction of metamaterials is that they have special, sometimes anomalous, properties over a limited frequency band. For example, mm-wave metamaterials may exhibit special properties over a millimeter band, which is the band of spectrum between 30 GHz and 300 GHz noted above.

In the context of the described embodiments, a metamaterial is a two-dimensional (2D) or three-dimensional (3D) array of elementary structures, which are coupled to each other. "Elementary structures," as used herein, may be referred to as discrete structures, element structures, or a combination thereof. In some cases, the elementary structures may be referred to simply as "structures."

The overall array provides macroscopic properties, which can be designed by the used elementary structures and their coupling paths. Metamaterials are configured for different kind of waves like electromagnetic waves (e.g., optical, infrared (IR), and mm-waves) and mechanical waves (e.g., ultrasonic). The scale of the elementary structures and their grid pitch scale with the wavelength of the target frequency range.

Elementary structures in mm-wave metamaterials may include resonator-elements, antenna-elements, filter-elements, waveguide-elements, transmission line elements, or a combination of those shown in FIG. 1. The elementary structure size may range up to several wavelengths but is typically below one wavelength. They consist of parts that generate magnetic fields (e.g., conductor rings) and other parts that create electrical fields (e.g., gaps between conductors). Furthermore, they also may have elements that have electromagnetic wave properties, such as a short transmission line segment.

In general, those elementary structures electrically represent resistive-inductive-capacitive (RLC) networks. In the frequency range where they will be used in the meta material, the characteristic of their resistive, inductive, and capacitive parameters is distributed over the geometry. Since filters, resonators, transmission lines, and antennas can be differently parametrized representatives of identical structures it is often not unambiguously possible to assign a structure to a single group. Thus, it is to be understood that a structure described as resonator can also be seen as antenna or a filter depending on its use or implementation details. Furthermore, the behavior may also change with the frequency where it is operated and a structure that behaves as transmission line for one frequency may also expose a filter characteristic or create a resonance at another frequency of operation. Finally, the choice of the material impacts the behavior which means that a choice of a better conductor will emphasize a resonant behavior while a less conductive material will increase the damping and make a filter characteristic dominant.

FIG. 1 illustrates a plurality of possible elementary structures according to one or more embodiments. The elementary structures 1 include a split ring resonator 2 having one capacitor coupling 2a, a split ring resonator 3 having two capacitor couplings 3a and 3b, a split ring resonator 4 having four capacitor couplings 4a-4d, antenna structure 5, an antenna coil 6, a nested split ring resonator 7, antenna structure 8, antenna structure 9, antenna structure 10, transmission line structure 11, antenna structure 12, coupled split ring resonators 13, split ring resonator 14, partial ring or coupling structure 15, and coupled split ring resonator 16.

The transmission line structure 11 may be a damping structure or delay structure. It may be used in an alternating configuration with resonators in order to establish an attenuated or phase shifted coupling between them instead of coupling directly. Coupling to the resonators can be capacitive or galvanic. It may also extend onto a second layer, for example, with an identical structure creating a real transmission line (i.e., two parallel wires).

The partial ring or coupling structure 15 may be referred to as a partial ring structure in the context of it being half of a split ring resonator 18. In this context, the partial ring structure 15 is coupled to a second layer to form a resonator. The partial ring or coupling structure 15 may also be used as a coupling structure as in the example in FIG. 3B. In this context, it provides capacitive coupling between ring resonator elements, but will not resonate remarkably (at least at the low frequency) as the coupled split ring resonators.

Furthermore, the elementary structures can be three-dimensional as well, such as spiral coils and nested split ring resonators that are oriented into all three Cartesian coordinate directions. Furthermore, three-dimensional structures can be generated by layering two-dimensional elementary structures in a stacked arrangement. For example, two elementary structures may be layered over one another in a vertical dimension so that they overlap with each other. In this way, a vertical capacitive coupling may be achieved between the two elementary structures and may be adjusted by varying an amount of overlap in a horizontal dimension.

FIG. 1 further illustrates a stacked split ring resonator structure 17 having three split ring resonators stacked on top of each other. The stacked split ring resonator structure 17 may be formed by using three metallization layers stacked on top of each other. FIG. 1 further illustrates a split ring resonator 18 made of two half-ring structures 15 that overlap such that a vertical capacitive coupling exists between the two half-ring structures. By varying the amount of overlap, the loop size can be made larger (e.g., by decreasing the amount of overlap) or smaller (e.g., by increasing the amount of overlap), which in turn results in a lower vertical capacitive coupling or a higher vertical capacitive coupling, respectively.

In order to achieve a quasi-homogeneous macroscopic behavior, the elementary structures are arranged in arrays which typically have dimensions that are larger than a wavelength of the target frequency range and include a multitude of elementary structures in each utilized direction.

Figures 2A, 2B:
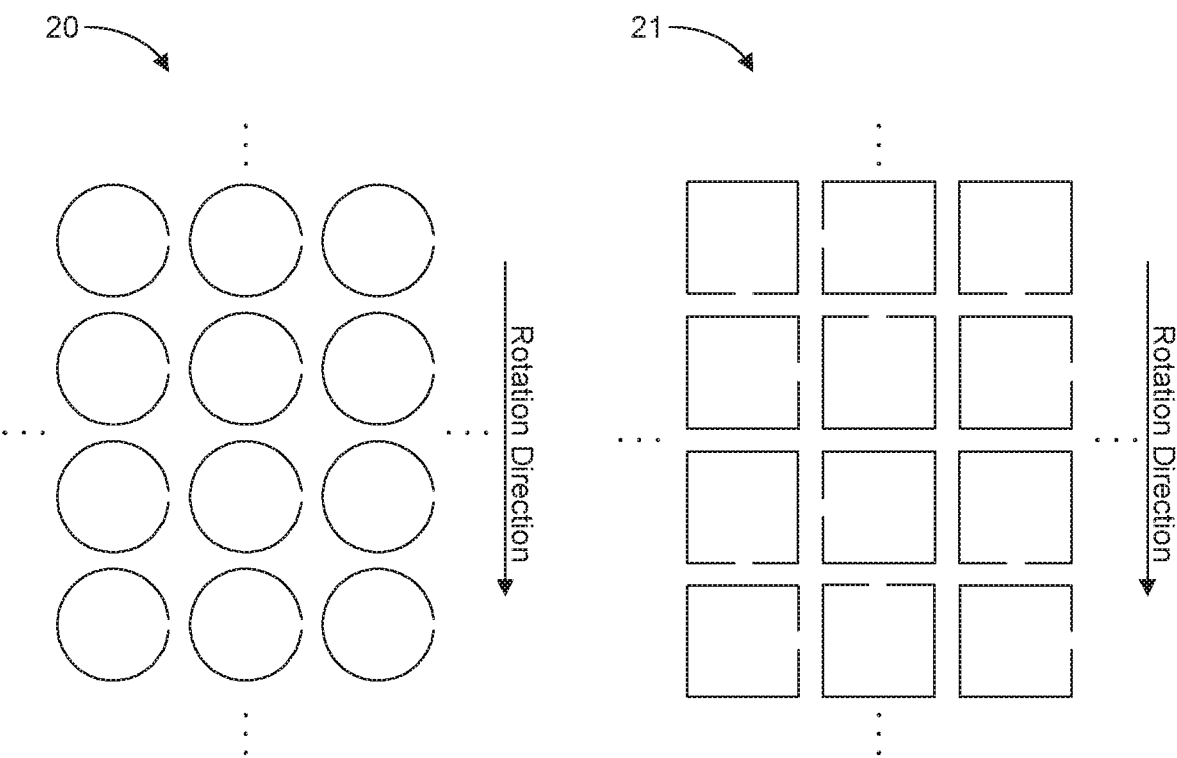
FIGS. 2A and 2B illustrate a segment of a mm-wave metamaterial track according to one or more embodiments.

FIGS. 2A and 2B illustrate a segment of a mm-wave metamaterial track according to one or more embodiments. A mm-wave metamaterial track is a stripe of mm-wave metamaterial that has multiple elementary structures arranged in both widthwise (axial) and lengthwise (rotational) dimensions. Here, the direction orthogonal to a rotation direction may be referred to as an axial direction.

Specifically, FIG. 2A shows an example of a 2D array 20 of split ring resonators, which are expected to extend further in both horizontal and rotational (circumferential) directions. However, it will be appreciated that the split ring resonators may be exchanged with any type of elementary structure, for example, with any of those shown in FIG. 1. Each split ring resonator comprises an open ring that represents an inductivity (L) and a gap or opening that provides a capacitive coupling (C). Thus, each split ring resonator is a type of LC resonator.

The elementary structures that make up the segment of a mm-wave metamaterial track shown in FIG. 2A have a fixed arrangement or fixed property along the rotation direction. For example, the split ring resonators in each row are arranged in the same position and orientation. Furthermore, the spacing between adjacent split ring resonators in the rotation direction is fixed along the track. As such, array 20 does not have any change in property of the metamaterial structures along the track in the rotation direction. One or more properties between the structures, such as spacing and orientation, may change in the axial direction as long as each row of structures has the same pattern.

There exists a mutual coupling of the structures in the array 20, which can be a capacitive coupling, an inductive coupling, or both. In this case, both types of coupling is present. For example, capacitive coupling between structures exists in the vertical direction (i.e., along the rotation direction) on the sides where rings are close together. In addition, inductive coupling between structures is provided by the field generated by each split ring resonator.

Thus, electrically, the arrangement of the elementary structures in an array introduces a mutual coupling between the elementary structures, wherein the coupling effect may utilize electric field (capacitive near field coupling), magnetic field (inductive near field coupling), waveguide coupling, or electromagnetic waves (far field coupling). Due to the dimensions of the arrays and depending on the type of used elementary structures, the coupling effect will typically made up of a mixture of all mechanisms.

The manner in which the structures are coupled affects the coupling behavior of the array or a portion of that array. In turn, this coupling behavior impacts an effect the individual structures or a group of structures have on a transmission wave or signal incident on that structure or that group of structures.

Furthermore, the coupling effect between structures is different if gaps or openings of neighboring structures are face-to-face or if the gaps face (i.e., are adjacent to) a closed segment of a neighboring structure. For example, FIG. 2B shows an example of 2D array 21 of split ring resonators in which an orientation of the split ring resonators changes in both the horizontal (width) and vertical (length) directions of the array 21 (i.e., of the metamaterial track). In other words, the location of the gap of each split ring resonator varies across neighboring structures and the rows of structures have different patterns. Here, while not required, it is possible that each row of structures has a unique pattern. As a result, the coupling effect between structures in FIG. 2B is different than the coupling effect produced by the structures shown in FIG. 2A.

Furthermore, the coupling effect between structures in FIG. 2B changes partially along the array in the rotation direction, whereas the coupling effect between structures in FIG. 2A does not change along the array in the rotation direction. The different shapes (circular versus rectangular) may also impact the characteristic of the structure itself and the coupling effect.

Each elementary structure has a size (e.g., a width or diameter) of 10% to 100% of the wavelength of a transmitted mm-wave to which the structure is sensitive. The array 20 may be a single metallization layer disposed or printed on a film such that the array 20 is two-dimensional. As noted above, it may also be possible to stack multiple metallization layers to form a 3D array.

Thus, arrays of elementary structures described herein include multiple repetitions of element structures having same or differing arrangements with respect to each other that induce a property on a transmission wave or signal incident thereon due to the coupling effect between the structures. As will be seen in FIGS. 3A-3G, at least one property changes along the array in the rotation direction which causes at least one coupling effect between elementary structures of the array to change continuously along the array in the rotation direction. This may allow, for example, to determine a rotational position change and/or a rotational angular position of the array. In contrast, for array 20, the properties are fixed along the array in the rotation direction such that the coupling effects between elementary structures of the array do not change and remain fixed along the array in the rotation direction.

As will become apparent in the following description, one or more mm-wave metamaterial tracks may also be used to perform torque measurements and/or off-axis angle measurements pertaining to a rotatable target object.

A mm-wave metamaterial track may be provided on a target object such that it forms a closed loop around an axis of rotation, thereby forming a 360° periodical pattern. In this way, a target object is a carrier structure for a mm-wave metamaterial track to be disposed. For example, the elementary structures of an array may have a 360° periodical pattern that may or may not change continuously around the circumference of the rotatable target and/or along the perimeter of the metamaterial track. For example, tracks used for direct torque measurement may not have any change in property of the metamaterial structures along the track in the rotational direction, such as the case for array 20. In contrast, tracks used for angle measurement, rotational position change, or indirect torque measurement may change in property of the metamaterial structures along the track in the rotational direction, such as the case for those tracks shown in FIGS. 3A-3G. If the pattern changes along the rotation direction, it may do so by continuously changing from 0° to 360° along the closed-loop of the metamaterial track, and then repeat.

There are diverse possibilities for changing a metamaterial property according to a 360° periodical pattern. It will also be appreciated that a rotational segment of less than 360° may also be applicable. For example, applications that measure limited angle ranges (e.g. throttle valve, chassis level, gas pedal) may also be used. In these cases, the target pattern need not be 360° periodic and can simply change the pattern from a minimum value to a maximum value over the used angle range (e.g., 45°, 60°, 90°, 180° etc.). It naturally follows that the target object also does not need to be a complete disc and can be reduced to a segment.

A property and/or arrangement of the metamaterial may be specific to an absolute angular position along the metamaterial track, and, thus, is also specific to an absolute angular position of the rotatable target object. An absolute angular position is an angular position relative to a predetermined (i.e., reference) angular position of the rotatable target object. For example, the reference angular position may be zero degrees, and an absolute angular position may a specific position rotated from zero degrees over a 360° period. Thus, each absolute angular position has an absolute angular value from 0° to 360°.

The following different variations may be used to change the behavior of metamaterial along a rotation direction. Thus, FIGS. 3A-3G show different arrangements or patterns of elementary structures of a metamaterial according to one or more embodiments. These tracks may be used for angle measurement of a corresponding carrier substrate, a rotational position change of a corresponding carrier substrate, or an indirect torque measurement of a torque applied to a rotatable shaft.

Figure 3A:
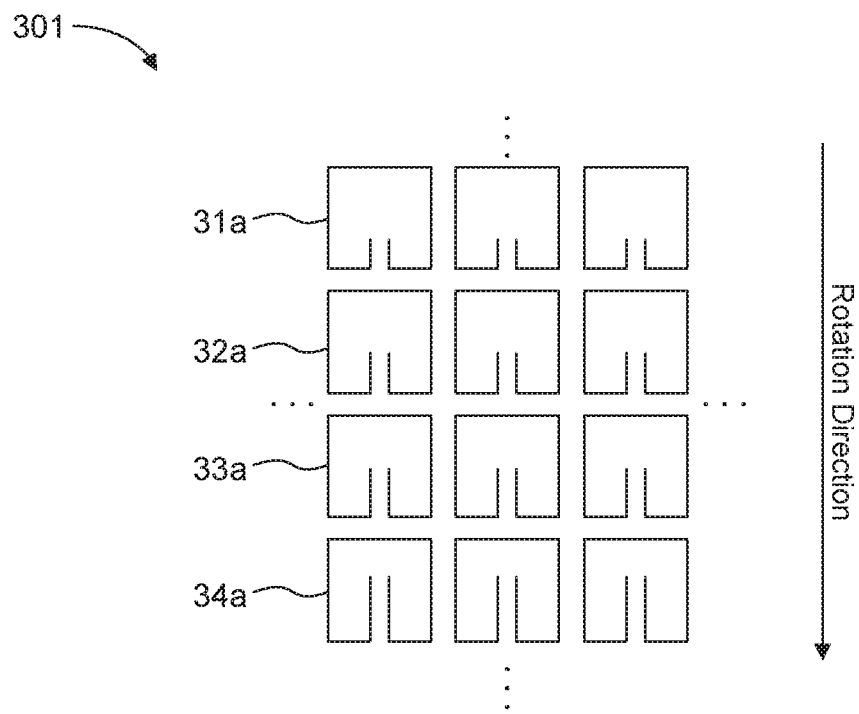
FIGS. 3A-3G show different arrangements or patterns of elementary structures of a metamaterial according to one or more embodiments.

FIG. 3A is a schematic diagram of an array of elementary structures 301 of a metamaterial track according to one or more embodiments. Here, the array includes multiple rows of split ring resonators 31a-34a in which the structures in each row have a same configuration and orientation. However, the structures in different rows have different configurations.

A 360° periodical pattern may be used to change the coupling capacitance of the split ring resonators along the rotation direction. For example, the coupling capacitance may be increased (or decreased) in the direction of rotation. Here, this is achieved by increasing (or decreasing) the length of the lines inside the opening of the split ring resonator, which results in a gradual and continuous increase (or decrease) in coupling capacitance in the rotation direction. This change in coupling capacitance along the rotation direction (i.e., along the perimeter of the metamaterial track) shifts the resonance frequency such that the change in the phase shift or the amplitude of a receive signal with respect to the transmit signal can be measured. Each phase shift value or amplitude value is specific to an absolute angular position (i.e., an angular value) of the rotatable target object.

Figure 3B:
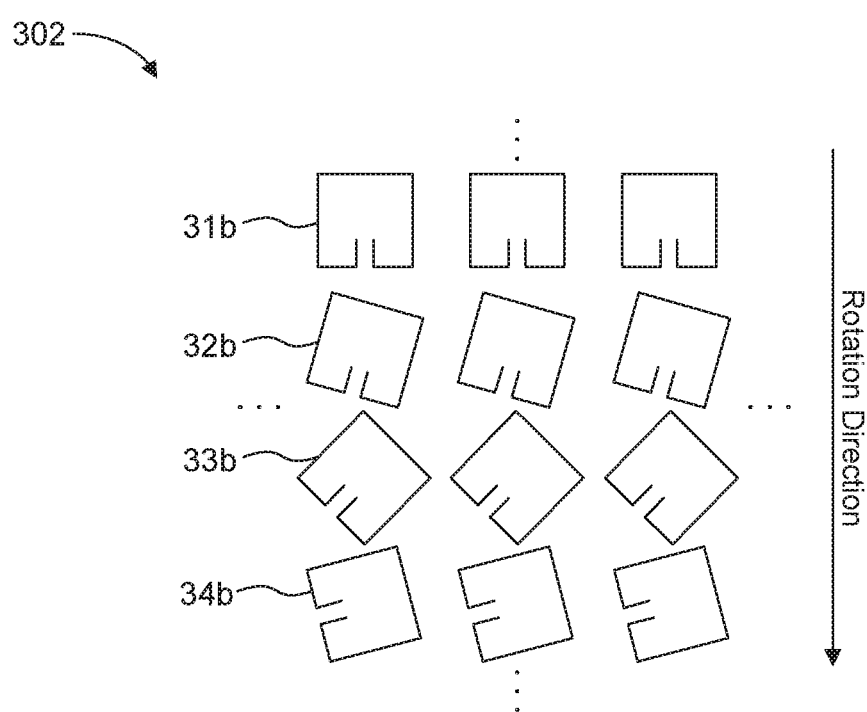

FIG. 3B is a schematic diagram of an array of elementary structures 302 of a metamaterial track according to one or more embodiments. Here, the array includes multiple rows of split ring resonators 31b-34b in which the structures in each row have a same configuration and orientation. However, the structures in different rows have different orientations.

Thus, on the surface of the target object, the split ring resonators 31b-34b are rotated or pivoted (e.g., clockwise or counterclockwise) incrementally in varying degrees along the rotation direction. As a result, the structures in each row have a different angled orientation with respect to structures in neighboring rows, resulting in a gradual and continuous increase (or decrease) in coupling capacitance in the rotation direction. This makes the metamaterial sensitive to a polarization of the mm-wave, and, specifically changes the sensitivity to the electrical field component of the transmitted wave that changes along the rotation direction. Here, an influence on the polarization is realized since the direction of the dominant E Field in the gap is changing. Thus, a shift in polarization may be measured that is specific to the absolute angular position (i.e., an angular value) of the rotatable target object.

Figure 3C:
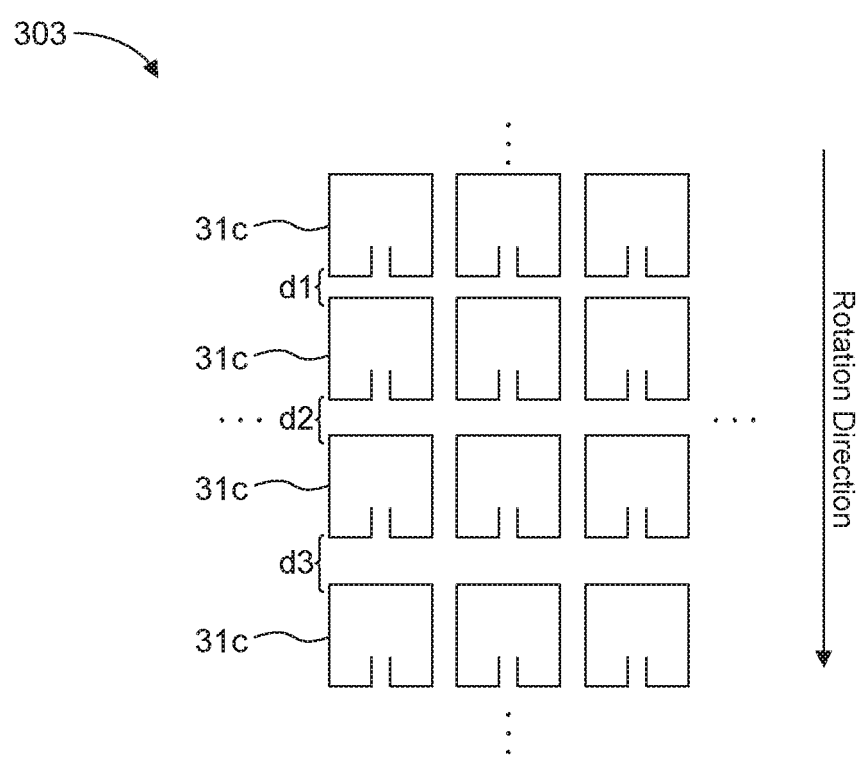

FIG. 3C is a schematic diagram of an array of elementary structures 303 of a metamaterial track according to one or more embodiments. Here, the array includes multiple rows of split ring resonators 31c in which the structures in throughout the array have a same configuration and orientation.

Here, the mutual capacitive coupling of the structures is gradually and continuously changed in the rotation direction by increasing or decreasing the distances d1, d2, d3, and so on between structures along the rotation direction. Thus, rows at the top are closer together than the rows at the bottom of the array. This scales the capacitance between structures in way that is periodical over 360°.

Figure 3D:
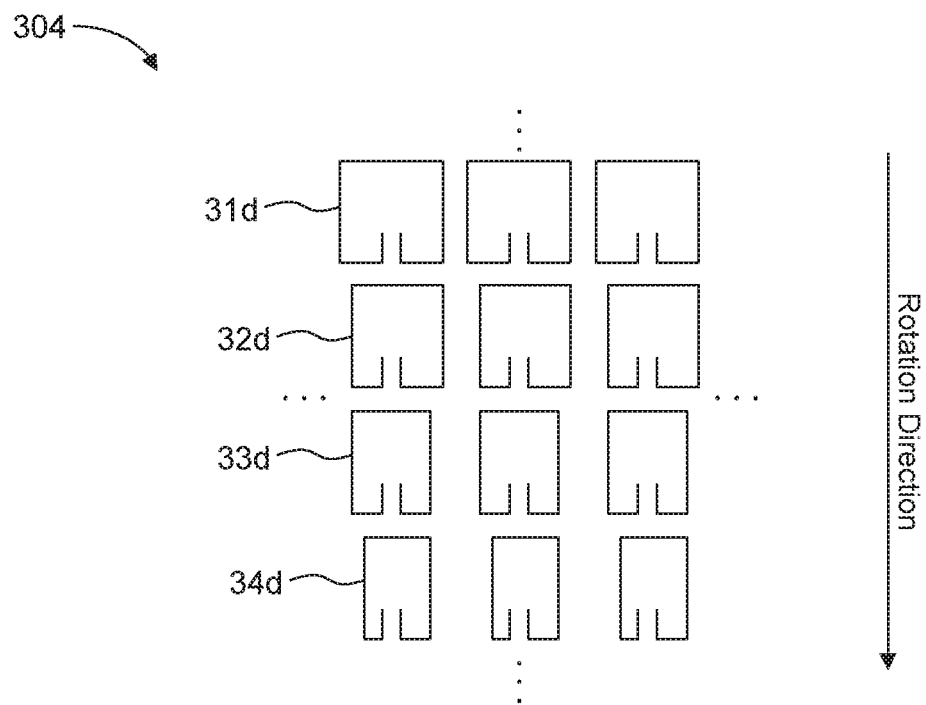

FIG. 3D is a schematic diagram of an array of elementary structures 304 of a metamaterial track according to one or more embodiments. Here, the array includes multiple rows of split ring resonators 31d-34d in which the structures in each row have a same configuration and orientation. However, the structures in different rows have different configurations.

In this case, an inductive coupling scaled by reducing or increasing the loop area in along the rotation direction. For example, the loop size of consecutive rows gradually changes along the rotation direction. Thus, the loop size of the split ring resonators 31d is larger than the loop size of the split ring resonators 32d, which is larger than the loop size of the split ring resonators 33d, and so on. This also results in a change in the spacing between structures in the direction perpendicular to the rotation direction, which may further change the capacitive coupling. This scales the inductive coupling and/or the capacitive coupling between structures in way that is periodical over 360°.

Figure 3E:
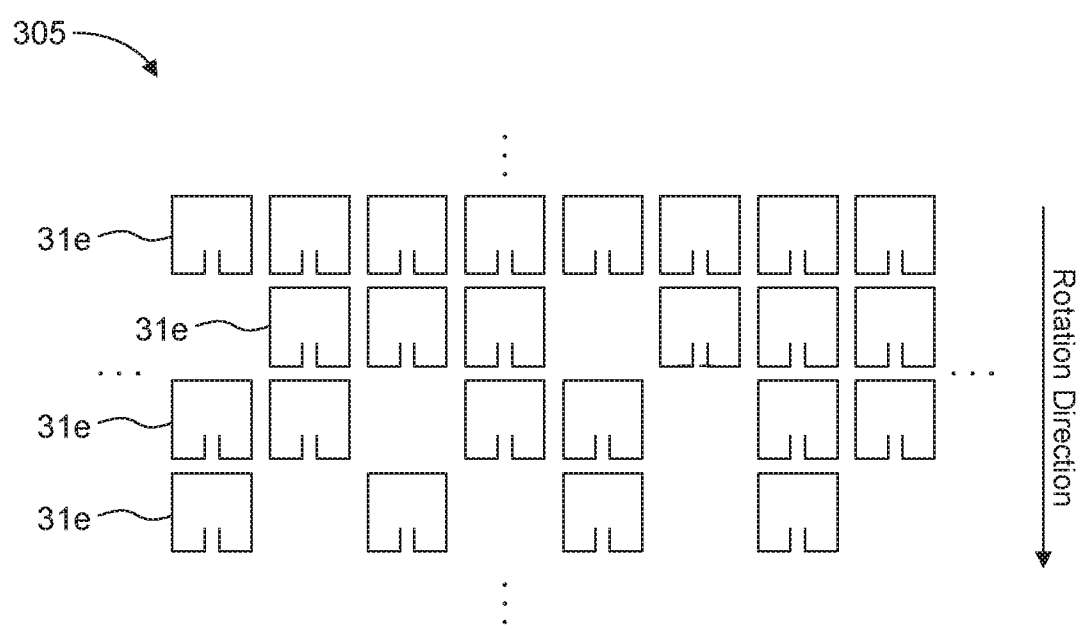

FIG. 3E is a schematic diagram of an array of elementary structures 305 of a metamaterial track according to one or more embodiments. Here, the array includes multiple rows of split ring resonators 31e in which the structures in throughout the array have a same configuration and orientation. However, the density of the structures is changed in the rotation direction by gradually and continuously increasing or decreasing the density of the structures along the rotation direction.

For example, each successive row of structures may be populated more densely or less densely than a preceding row of structures. For example, every position in a first row may be occupied by a structure making up a first (full) density of structures in that row. In a second row, less than every position is occupied by a structure making up a second density of structures in that row that is less dense than the first density. In a third row, less than every position is occupied by a structure making up a third density of structures in that row that is less dense than the second density, and so on. This scales the inductive coupling and/or the capacitive coupling between structures in way that is periodical over 360°.

Figure 3F:
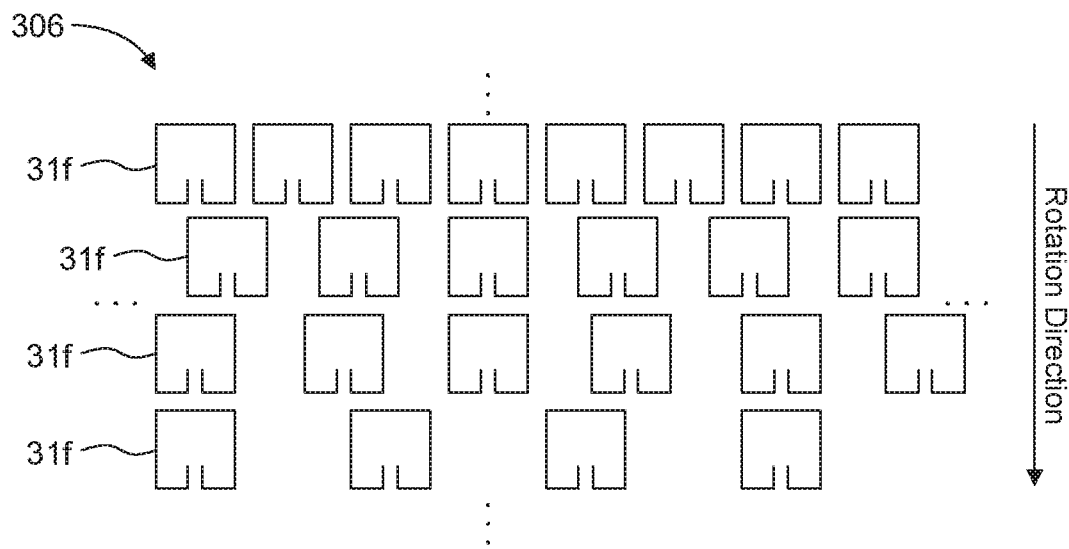

FIG. 3F is a schematic diagram of an array of elementary structures 306 of a metamaterial track according to one or more embodiments. Here, the array includes multiple rows of split ring resonators 31f in which the structures in throughout the array have a same configuration and orientation. However, the density of the structures is changed in the rotation direction by gradually and continuously increasing or decreasing the density of the structures along the rotation direction.

In this example, a lateral distance between structures in each successive row may be changed in the rotation direction by increasing or decreasing the spacing between structures along the rotation direction. For example, every position in a first row may be occupied by a structure making up a first (full) density of structures in that row. In a second row, the spacing between adjacent structures is increased in comparison to the spacing between adjacent structures in the first row, making up a second density of structures in that row that is less dense than the first density. In a third row, the spacing between adjacent structures is increased in comparison to the spacing between adjacent structures in the second row, making up a third density of structures in that row that is less dense than the second density, and so on.

Figure 3G:
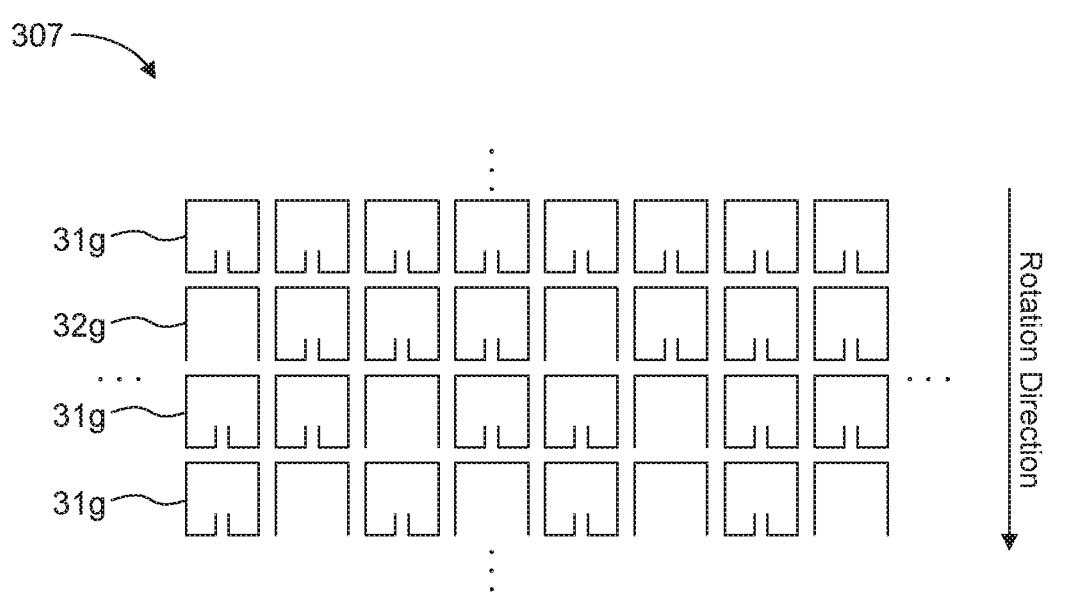

FIG. 3G is a schematic diagram of an array of elementary structures 307 of a metamaterial track according to one or more embodiments. Here, the array is a heterogeneous array of mixed different structures such that the structure types that populate the array is varied in different arrangements throughout the array. In this case, two different types of structures 31g and 32g are use in a pattern that gradually and continuously changes the inductive coupling and/or the capacitive coupling between structures in way that is periodical over 360°. It will be appreciated that two or more types of structures may also be used to form the heterogeneous array.

In view of the above examples, scaling of a metamaterial property is done with a pattern of structures that repeats or changes completely and continuously around the circumference of the rotatable target or along the perimeter of the metamaterial track such that a change in reflectivity and/or transmittivity follows a 360° periodical pattern where the reflectivity and/or transmittivity is unique for each discrete angle.

Figure 4A:
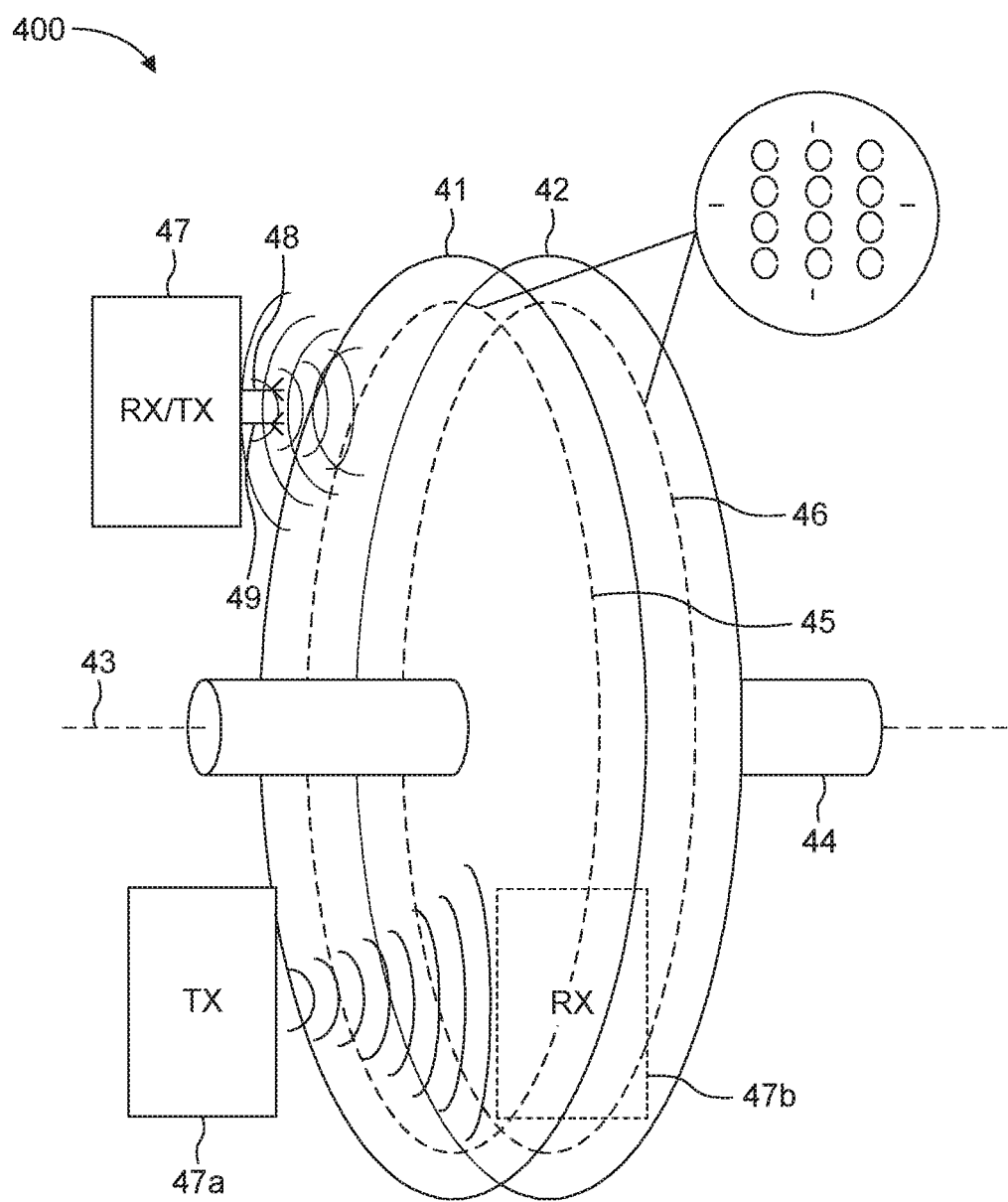
FIG. 4A is a schematic view of a torque measurement system according to one or more embodiments.

FIG. 4A is a schematic view of a torque measurement system 400 according to one or more embodiments. The torque measurement system 400 includes a first rotatable target object 41 as a first rotatable carrier structure and a second rotatable target object 42 as a second rotatable carrier structure. Both carrier structures are configured to rotate about an axis of rotation 43 (i.e., a rotational axis). The rotatable target objects 41 and 42 may be a disc or a wheel coupled to a shaft 44 that extends along the rotational axis 43. As the shaft 44 rotates, so do the rotatable target objects 41 and 42. The rotatable target objects 41 and 42 represent mechanical targets for one or more mm-wave beams. Additionally, the rotatable target objects 41 and 42 are laterally separated from each other by a distance along the shaft 44. In particular, they are laterally spaced apart from each other in a transmission direction of mm-wave beams.

Each rotatable target object 41 and 42 includes a mm-wave metamaterial track 45 and 46, respectively, that each form a closed loop around the shaft 44. In this regard, each target object 41 and 42 is a carrier structure for its respective mm-wave metamaterial track. The mm-wave metamaterial tracks 45 and 46 are fixed to a respective rotatable target object 41 or 42 such that they co-rotate with the respective rotatable target object 41 or 42 as it rotates. Additionally, the mm-wave metamaterial tracks have the same size and shape. As such, in a similar manner regarding the rotatable target objects 41 and 42, the metamaterial tracks 45 and 46 are laterally spaced apart from each other, and, more particularly, are laterally spaced apart from each other in a transmission direction of mm-wave beams.

According to at least one embodiment, metamaterial tracks 45 and 46 each have an array of structures whose properties do not change in the rotation direction, as explained above in reference to FIG. 2A. Furthermore, the two metamaterial tracks 45 and 46 are close enough that the two tracks have a mutual coupling with each other that is induced by a field effect (e.g., an electric field coupling, a magnetic field coupling, or an electromagnetic field coupling) thereby forming a resonant multitrack structure (i.e., a mutually coupled structure). The mutual coupling between tracks 45 and 46 results in a torque-dependent behavior or interaction with an mm-wave where the torque-dependent behavior or interaction is a torque-dependent reflection, a torque-dependent absorption, a torque-dependent transmission, or a torque-dependent combination thereof.

When the shaft 44 rotates, there is a torque dependent shift in angular position (i.e., an angular shift) between the two metamaterial tracks 45 and 46 due to the torque applied to the shaft 44. This results in a torque dependent shift in the mutual coupling between the two metamaterial tracks 45 and 46. Since multiple of the metamaterial properties change simultaneously in response to the applied torque, multiple mm-wave parameters of a signal either transmitted, reflected, or emitted by mutually coupled metamaterial tracks will depend on the applied torque. Two or more mm-wave parameters of a same signal or of different signals may be evaluated simultaneously to discriminate the applied torque. Similarly, a single parameter of two or more signals may also be evaluated to discriminate the applied torque. Consequently, a measurement of all relevant variations can be used to improve the unambiguousness of the torque determination.

The torque measurement system 400 further includes a transceiver TRX 47 configured to transmit and receive mm-waves, or a transmitter 47a and a receiver 47b configured to transmit and receive mm-waves. The transmitter 47a and a receiver 47b may be placed such that the two rotatable target objects 41 and 42 and, thus, the two tracks 45 and 46, are arranged between the transmitter 47a and a receiver 47b.

The transceiver 47 includes a transmitter antenna 48 configured to transmit a mm-wave beam (i.e., an electro-magnetic transmit signal) as a wireless electro-magnetic signal focused at the two metamaterial tracks 45 and 46. In the case that a separate transmitter 47a and receiver 47b is used, the transmitter 47a may be equipped with the transmitter antenna 48.

The transceiver 47 also includes a receiver antenna 49 configured to receive a partially-reflected mm-wave (i.e., an electro-magnetic receive signal) as a wireless electro-magnetic signal from both metamaterial tracks 45 and 46. It may also be implemented in a way where one antenna is used as a transmit and receive antenna and a splitter separates energy transmission paths (e.g., a rat-race coupler or a hybrid ring coupler) in the RF part. The splitter is configured to direct the received wave from the antenna to the receiver while it directs the transmit signal from the transmitter to the antenna for transmission.

In the case that a separate transmitter 47a and receiver 47b is used, the receiver 48a may be equipped with the receiver antenna 49. Here, the torque measurement system 400 is configured to monitor mm-waves that pass through the two metamaterial tracks 45 and 46 instead of monitoring reflected mm-waves as was the case with the transceiver 47. As a result, the receiver antenna 49 is configured to receive partially transmitted mm-waves (i.e., electro-magnetic receive signals) as a result of the transmitted mm-wave interacting with (i.e., being partially absorbed by and transmitted through) the metamaterial tracks 45 and 46.

It will further be appreciated that two transceivers, one for each metamaterial track, can be used. It will further be appreciated that two receiver and transmitter pairs, one for each metamaterial track, can be used instead of one or more transceivers. It may also be implemented in a way where one antenna is used as transmit and receive antenna and a splitter separates energy transmission paths (e.g., a rat-race coupler or a hybrid ring coupler) in the RF part. The splitter is configured to direct the received wave from the antenna to the receiver while it directs the transmit signal from the transmitter to the antenna for transmission.

Regardless of the configuration, it will be understood that at least one transmitter and at least one receiver is implemented for transmitting and detecting mm-wave beams. The transmitters and receivers may be electrically coupled to a system controller and/or a DSP.

As noted above, the two metamaterial tracks 45 and 46 are close enough that the tracks have a mutual coupling (e.g., an electric field coupling, a magnetic field coupling, or an electromagnetic field coupling) with each other thereby forming a resonant structure that results in a torque dependent shift of the transmission or the reflection that is caused by the resonant structure. The torque dependent mutual coupling between the metamaterial tracks 45 and 46 may be capacitive, inductive, or a combination thereof. In the latter case, one type of coupling may be dominant. For example, capacitive coupling between the two tracks may be dominant.

As an example, in the case that the two metamaterial tracks 45 and 46 are made up of elementary structures 15, the elementary structures 15 of the two metamaterial tracks 45 and 46 couple together to form a split ring resonator 18 as an elementary structure having two poles, which is a resonator whose poles are modified by the shift between the two layers caused by the applied torque. Thus, the mutual coupling characteristic between the two tracks 45 and 46 changes based on the rotational displacement the two tracks undergo as a result of the applied torque. As a result, one or more properties (e.g., amplitude and/or phase) of the signal emitted from the resonant multitrack structure formed by the two tracks changes based on the rotational displacement, which thus changes based on the applied torque.

In another example, the two metamaterial tracks 45 and 46 are made up of elementary structures 2, the elementary structures 2 of the two metamaterial tracks 45 and 46 couple together to form a stacked split ring resonator structure 17 having four pols (2 poles for each elementary structure 2), which is a resonator whose poles are modified by the shift between the two layers caused by the applied torque. Thus, the mutual coupling characteristic between the two tracks 45 and 46 changes based on the rotational displacement the two tracks undergo as a result of the applied torque. As a result, one or more properties (e.g., amplitude and/or phase) of the signal emitted from the resonant multitrack structure formed by the two tracks changes based on the rotational displacement, which thus changes based on the applied torque.

It will be appreciated that other combinations of elementary structures is possible, forming different types of mutually coupled structures that have one or more characteristics that change based on the rotational displacement caused by the applied torque.

It is also noted that the mm-wave, being an electromagnetic wave, has an electrical field component that stimulates the capacitance of a metamaterial track or the resonant multitrack structure and a magnetic field component that stimulates the inductance of a metamaterial track or the resonant multitrack structure. Each elementary structure reflects a part of the mm-wave directly, transmits a part of the mm-wave directly, and receives a part of the energy and stores it in its resonance oscillation. The oscillation caused by the transmission radiates a part of the energy in either direction. Thus, each metamaterial track absorbs part of the energy and stores it. Additionally, each metamaterial track eventually emits the energy that has been absorbed and stored.

The resonant multitrack structure, also referred to as a mutually coupled (multitrack) structure, may also be viewed as a single structure that emits a mm-wave, either as a reflection and/or a transmission, in response to the transmitted mm-wave from the transceiver 47 impinging thereon. This emitted wave has a torque dependent property that may be evaluated by the receiver circuit to determine the applied torque. For example, a phase shift and/or an amplitude shift of the received signal with respect to the transmitted mm-wave may be determined and evaluated to determine the applied torque.

In particular, when the shaft 44 rotates, there is a torque dependent shift in angular position (i.e., an angular shift) between the two metamaterial tracks 45 and 46 due to the torque applied to the shaft 44. For example, the target objects 41 and 42 rotate by different amounts due to the applied torque. As a result, the absolute angular position or discrete angular value corresponding to track 45 is different than the absolute angular position or discrete angular value corresponding to track 46, resulting in angular difference or angular shift that is proportional to the applied torque. The coupling effect between tracks 45 and 46 is torque-dependent and changes based on their angular shift resultant from the applied torque. This change in coupling in turn impacts at least one coupling-dependent property of a signal interacting with the mutually coupled structure, which can be measured to determine the applied torque.

A processor at the receiver is configured to receive at least one signal from the mutually coupled structure and determine the applied torque based on one or more evaluated properties of the at least one received signal. The processor may determine the applied torque based on the evaluated property or properties using, for example, a look-up table or an algorithm.

For example, the signal emitted by the mutually coupled structure formed by tracks 45 and 46 may have at least one property or combination of properties unique to the angular shift therebetween, and thus unique to the applied torque. This is referred to as a direct torque measurement.

Alternatively, the processor may receive signals from each track 45 and 46 of the mutually coupled structure, determine a torque-dependent absolute angular position corresponding to each track, determine the angular difference or shift therefrom, and then determine the applied torque based on the determined angular difference using, for example, a look-up table or an algorithm. In this case, the tracks 45 and 46 may have array structures that vary in the rotation direction, as described in reference to 3A-3G, so that the angular position of each track can be determined. This is referred to as an indirect torque measurement.

As an example for determining an absolute angular position or discrete angular value for a given metamaterial track, the transceiver 47 may transmit a continuous mm-wave as a carrier signal that has a constant frequency. Each metamaterial track that receives the carrier signal may partially reflect the signal back at the transceiver 47. The transceiver 47 includes a receiver circuit that includes two demodulators (e.g., two mixers), each configured to demodulate a received signal from a corresponding metamaterial track. Alternatively, the receiver circuit may include a multiplexer coupled to single demodulator that demodulates two received signals in a multiplexed manner. In any case, the receiver circuit is configured to determine a phase and/or an amplitude of each received signal, and compare the determined phase and/or amplitude to the phase and/or amplitude of the carrier signal, respectively, to derive the absolute angular position of the corresponding metamaterial track. A certain change in phase or amplitude relative to the carrier signal (i.e., a phase shift or an amplitude shift) corresponds to the absolute angular position of the corresponding metamaterial track. It is also possible for the receiver circuit to match the phase and/or amplitude differences of two received signals (i.e., one from each track 45 and 46) directly to the torque without calculating the absolute angular positions, via a mapping, look-up table, or the like, that maps differential values of phase and/or amplitude to different amounts of torque (i.e., torque values).

An applied torque for a given mutually coupled structure may be determined in a similar manner for a direct torque measurement. For instance, the transceiver 47 may transmit a continuous mm-wave as a carrier signal that has a constant frequency at the mutually coupled structure. The mutually coupled structure that receives the carrier signal may partially reflect the signal back at the transceiver 47. The mutual coupling between two metamaterial tracks of the mutually coupled structure depends on the applied torque, which is affects a torque dependent property of the reflected signal.

The transceiver 47 includes a demodulator that is configured to demodulate the received signal and a processor that is configured to evaluate a property of the received signal using at least one of phase analysis, amplitude analysis, or spectral analysis, and determine the applied torque based on the evaluated property.

In particular, the processor is configured to determine a phase and/or an amplitude of each received signal, and compare the determined phase and/or amplitude to the phase and/or amplitude of the carrier signal, respectively, to derive the applied torque. A certain change in phase or amplitude relative to the carrier signal (i.e., a phase shift or an amplitude shift) corresponds to the applied torque.

In summary, the torque measurement system 400 uses two target objects (i.e., two carrier structures) 41 and 42 each with a metamaterial pattern 45 and 46 on their neighboring surfaces. Each carrier structure is fixed to a shaft 44 within a certain distance between the neighboring carrier structures. If a torque is applied to the shaft 44, the shaft 44 winds depending on its thickness and its Young's modulus. The distance between the carrier structures is close enough to ensure that the two metamaterial tracks 45 and 46 mutually couple. Depending on the shift of the two metamaterial patterns of the two metamaterial tracks, the coupling effect between the two metamaterial tracks changes. This coupling effect is unique to the amount of applied torque. As a result, the change in the coupling effect causes a property of one or more signals emitted from the metamaterial tracks 45 and 46 to be altered, which can be measured and analyzed for determining the applied torque.

Figure 4B:
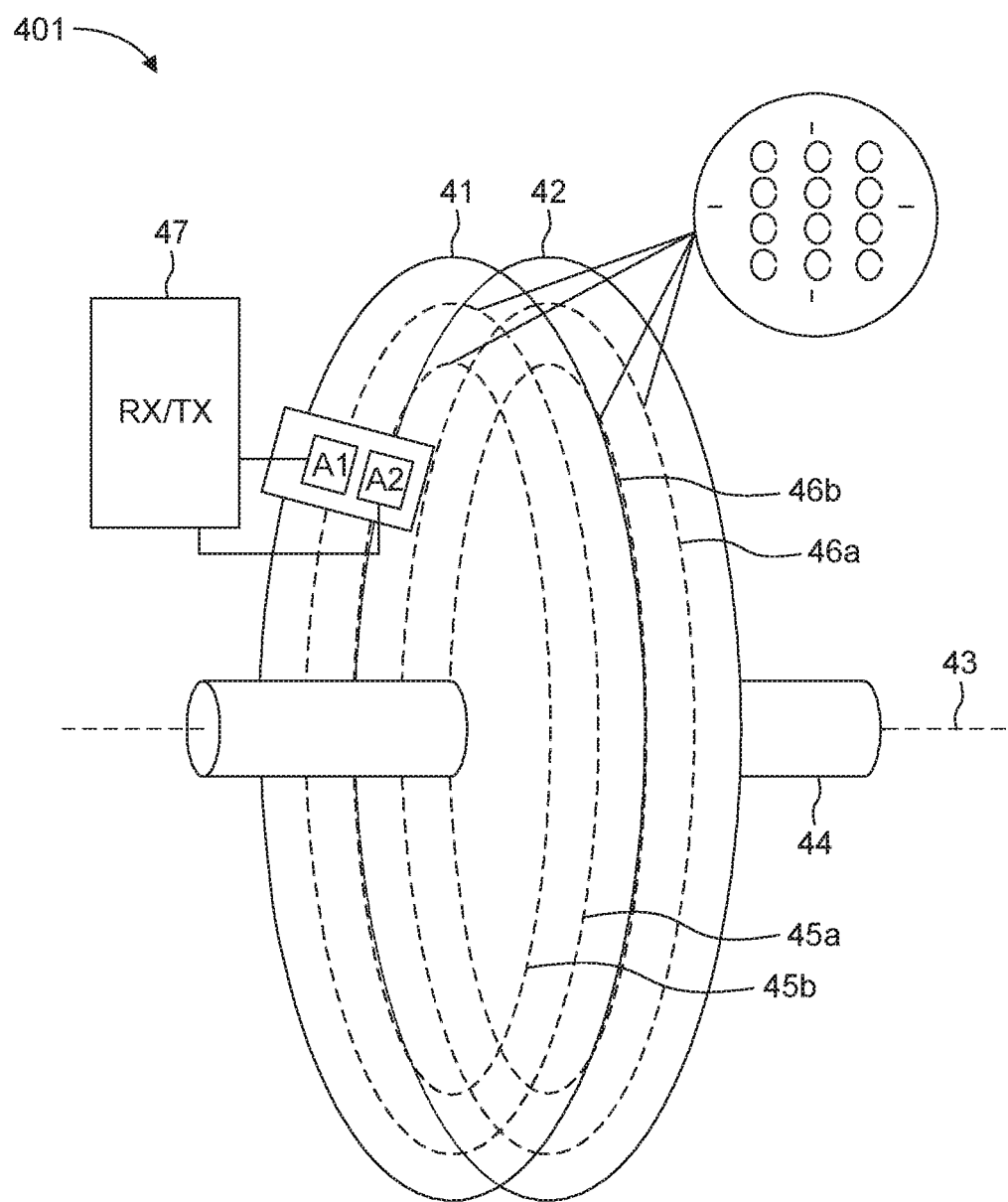
FIG. 4B is a schematic view of another torque measurement system according to one or more embodiments.

FIG. 4B is a schematic view of a torque measurement system 401 according to one or more embodiments. The torque measurement system 401 is similar to the torque measurement system 400 depicted in FIG. 4A, with the exception that the torque measurement system 401 includes additional metamaterial tracks on each rotatable target object 41 and 42. Two metamaterial tracks 45a and 45b are attached to rotatable target object 41 and two metamaterial tracks 46a and 46b are attached to rotatable target object 42. The two mm-wave metamaterial tracks 45a and 45b attached to rotatable target object 41 are concentric loops located at different distances from the rotational axis 43. Similarly, the two mm-wave metamaterial tracks 46a and 46b attached to rotatable target object 42 are concentric loops located at different distances from the rotational axis 43.

Furthermore, metamaterial tracks 45a and 46a are aligned (i.e., are located at the same radial distance from the rotational axis 43) and are in close proximity such that they are mutually coupled. Similarly, metamaterial tracks 45b and 46b are aligned (i.e., are located at the same radial distance from the rotational axis 43) and are in close proximity such that they are mutually coupled. Thus, two mutually coupled structures are formed, where the first one is formed by tracks 45a and 46a, and the second one is formed by tracks 45b and 46b.

In addition, the torque measurement system 401 includes two antennas A1 and A2 both configured to transmit and receive mm-wave signals. Here, antenna A1 is aligned with metamaterial tracks 45a and 46a, and, as such, is configured to transmit a mm-wave beam at those mutually coupled tracks and receive reflected signals therefrom. Similarly, antenna A2 is aligned with metamaterial tracks 45b and 46b, and, as such, is configured to transmit a mm-wave beam at those mutually coupled tracks and receive reflected signals therefrom.

As a result, different regions of metamaterial tracks can be arranged on the carrier structures and provide a different measurements. Preferably, the different regions at which the metamaterial tracks on a same carrier structure are attached are spaced in a way that the coupling between an inner rings and an outer ring is negligible compared to the coupling between the rings on the different carrier structures. For example, tracks 45a and 46a are strongly coupled by a field effect, whereas tracks 45a and 45b are weakly coupled or not coupled by a field effect. For this reason, tracks 45a and 46a may form a first coupled pair of tracks and tracks 45b and 46b may form a second coupled pair of tracks.

An antenna A1 or A2 is associated to each mutually coupled structure. Preferably the antennas A1 and A2 should have a directional characteristic that focusses their transmission and reception on the associated rings of the metamaterial structures. Thus, antenna A1 has a directional characteristic associated with tracks 45a and 46a (i.e., a first mutually coupled structure), and antenna A2 has a directional characteristic associated with tracks 45b and 46b (i.e., a second mutually coupled structure).

In case of identical patterns of elementary structures, the displacement of the elementary structures on both carrier structures will be different due to the different radius (d1=r1*da; d2=r2*da). Consequently, the change of the mm-wave property is lower on the inner track than on the outer track. In other words, a same angle shift of the shaft 44 causes a different change in the coupling of the two pairs of coupled tracks, resulting in two different signal modulations (i.e., amplitude and/or phase) in the receive signals generated by the different coupled pair of tracks.

The receiver circuit of transceiver 47 may then use a differential measurement to discriminate the applied torque which is more robust against external factors such as the influence of distance changes. For example, the receiver circuit may use signals received from the two mutually coupled structures to perform a differential measurement of the applied torque via a differential algorithm applied to the two signals.

Figure 4C:
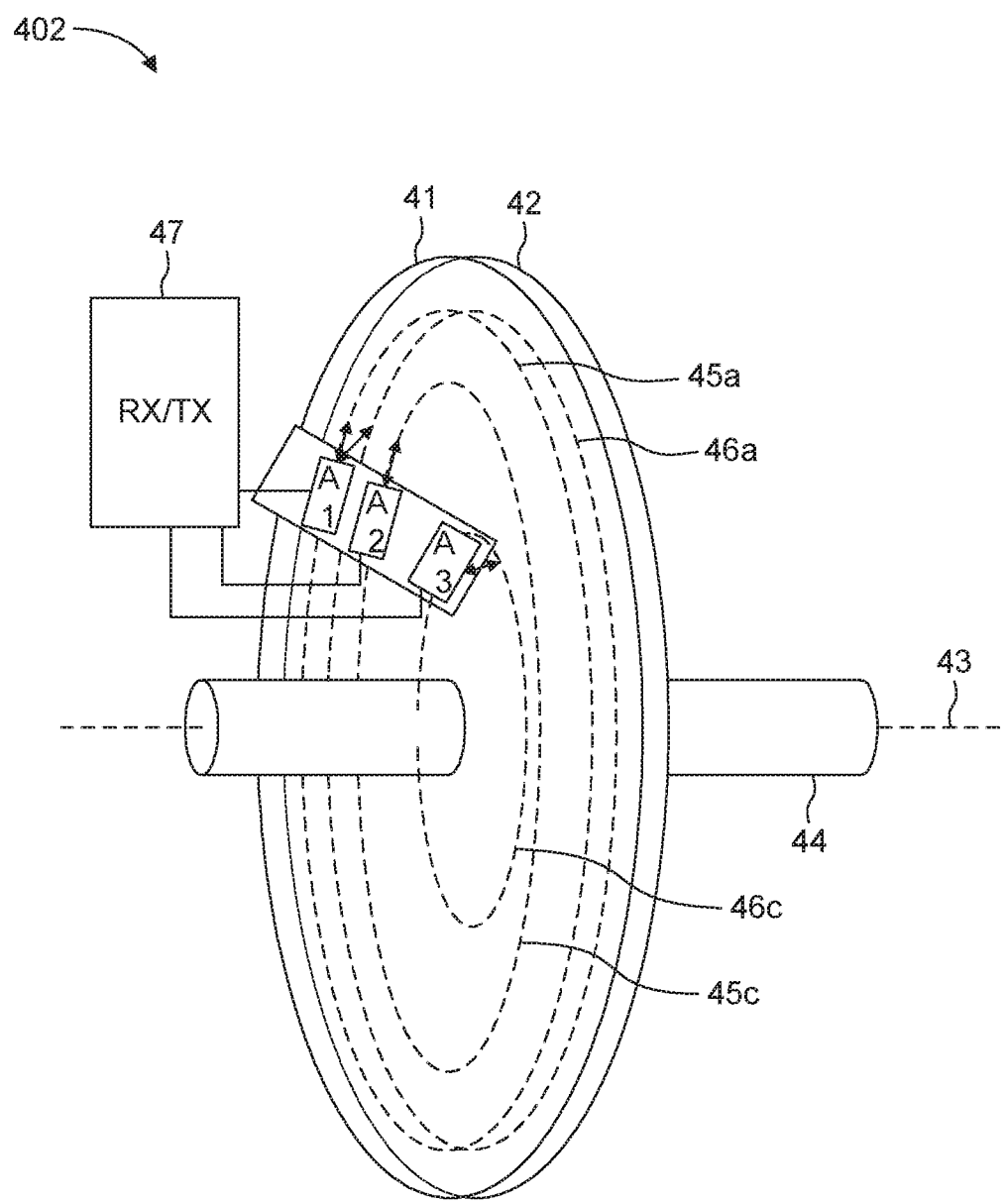
FIG. 4C is a schematic view of another torque measurement system according to one or more embodiments.

FIG. 4C is a schematic view of a torque measurement system 402 according to one or more embodiments. The torque measurement system 402 is similar to the torque measurement system 400 depicted in FIG. 4A, with the exception that the torque measurement system 402 includes additional metamaterial tracks on each rotatable target object 41 and 42. Two metamaterial tracks 45a and 45c are attached to rotatable target object 41 and two metamaterial tracks 46a and 46c are attached to rotatable target object 42. Thus, a single mutually coupled structure is formed by tracks 45a and 46a.

The two mm-wave metamaterial tracks 45a and 45c attached to rotatable target object 41 are concentric loops located at different distances from the rotational axis 43. Similarly, the two mm-wave metamaterial tracks 46a and 46c attached to rotatable target object 42 are concentric loops located at different distances from the rotational axis 43. Furthermore, tracks 45c and 46c are located at different distances from the rotational axis 43 such that mutual coupling therebetween is weak or zero.

This arrangement is similar to the torque measurement system 401 depicted in FIG. 4B, except the additional tracks 45c and 46c are not mutually coupled to each other or to any other track as is the case with tracks 45b and 46b. Instead, tracks 45c and 46c are reference metamaterial tracks for their respective target object (i.e., carrier structure) 41 or 42 and may be used to determine an absolute angular position of its respective target object 41 or 42.

Tracks 45c and 46c may both have an array of structures that has at least one property that changes in the rotation direction, as explained above in reference to FIGS. 3A-3G. Thus, the characteristic or property of the metamaterial at a specific position along the track results an angle-dependent behavior or interaction with an mm-wave, where the angle-dependent behavior or interaction is an angle-dependent reflection, angle-dependent absorption, angle-dependent transmission, or an angle-dependent combination thereof. Since multiple of the metamaterial properties are changing simultaneously, multiple mm-wave parameters of a signal either transmitted, reflected, or emitted by a metamaterial track will depend on the rotational angle. Two or more mm-wave parameters of a same signal or of different signals may be evaluated simultaneously to discriminate the rotational position. Similarly, a single parameter of two or more signals may also be evaluated to discriminate the rotational position. Consequently, a measurement of all relevant variations can be used to improve the unambiguousness of the angle determination.

Here, three antennas A1, A2, and A3 are utilized, each having a directional characteristic that focusses their transmission and reception on the one or more associated rings of the metamaterial structures. Thus, antenna A1 has a directional characteristic associated with tracks 45a and 46a, antenna A2 has a directional characteristic associated with track 45c, and antenna A3 has a directional characteristic associated with track 46c

Thus, there is an additional metamaterial track 45c, read by antenna A2, that is added on the front carrier structure 41 without a coupling track on the backside carrier structure 42, and an additional metamaterial track 46c, read by antenna A3, that is added to the backside carrier structure 42 without a coupling to the front side carrier structure 41. Consequently, the mm wave properties of those reference tracks 45c and 46c are not influenced by the displacement of the two carrier structures relative to each other due to mutual coupling and are therefore torque independent. Whereas, the mutual coupling between tracks 45a and 46a and the mutual coupling between tracks 45b and 46b are torque dependent.

These reference tracks 45c and 46c can be used by the receiver circuit of the transceiver 47 as references for measurements that can be used to eliminate influences resulting from the setup, e.g., variations of the distance between the antennas and the distance between the two carrier structures 41 and 42.

For example, the receiver circuit of the transceiver 47 may be configured to determine a torque-independent absolute angular position of the carrier structure 41 by analyzing an amplitude modulation or a phase modulation of a receive signal received from track 45c at antenna A2 in reference to a carrier signal transmitted by the antenna A2 based on methods described above. The receiver circuit may use the torque-independent absolute angular position as the actual absolute angular position of the carrier structure 41, which may be further used to calculate the rotational speed thereof. Additionally, the receiver circuit may use the torque independent absolute angular position to detect preexisting errors in the set up and compensate the torque dependent measurements.

Similarly, the receiver circuit of the transceiver 47 may be configured to determine a torque independent absolute angular position of the carrier structure 42 by analyzing an amplitude modulation or phase modulation of a receive signal received from track 46c at antenna A3 in reference to a carrier signal transmitted by the antenna A3 based on methods described above. The receiver circuit may use the torque independent absolute angular position as the actual absolute angular position of the carrier structure 42, which may be further used to calculate the rotational speed thereof. Additionally, the receiver circuit may use the torque independent absolute angular position to detect preexisting errors in the set up and compensate the torque dependent measurements.

In addition, the torque independent structures may also be angle independent. For example, tracks 45c and 46c may have a homogeneous pattern, such as the one shown in FIG. 2A, with known behavior for the measurement of the distance between the track and the antenna.

Figure 5:
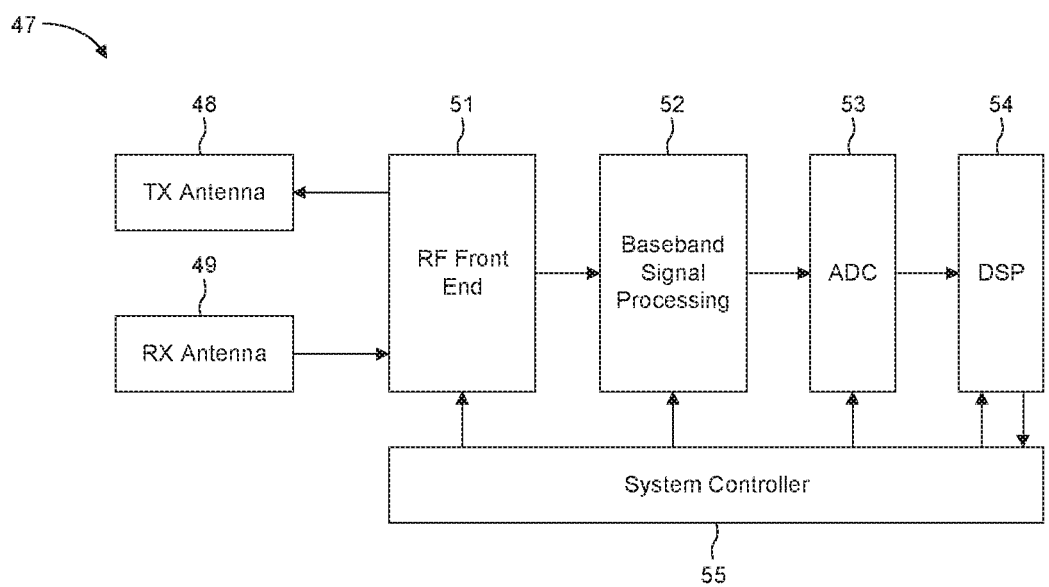
FIG. 5 is a block diagram that illustrates a transceiver circuit of the transceiver according to one or more embodiments.

FIG. 5 is a block diagram that illustrates a transceiver circuit of the transceiver 47 according to one or more embodiments. The transceiver 47 includes relevant transmission circuitry and receiver circuitry to the embodiments described herein. It will also be appreciated that relevant transmission circuitry and receiver circuitry may be divided between the transmitter 47a and receiver 47b according to implementation.

Frequency modulation may be used on the transmitter side to characterize the transfer function of the transmission channel including the metamaterial over frequency. However, a continuous carrier wave with a constant frequency may also be used.

On the measurement side (receiver side), it would still be magnitude (amplitude) and phase or I and Q, which would be the most sophisticated and flexible solution. However, with respect to cost, a system with a constant frequency carrier may be preferable. In this case, the frequency is chosen to be in a defined region with respect to the poles and zeros where the phase or amplitude transfer function has a monotonous behavior with respect to the modified property of the metamaterial. Then a local measurement of phase shift or amplitude attenuation is used.

Accordingly, at least one transmission antenna 48 (TX antenna) and a receiver antenna 49 (RX antenna) are connected to an RF front end 51 integrated into a chip, which front end may contain all those circuit components that are required for RF signal processing. These circuit components comprise for example a local oscillator (LO), RF power amplifiers, low noise amplifiers (LNA), directional couplers (for example rat-race couplers, circulators, etc.), and mixers for downmixing (or down-converting) the RF signals into baseband or an intermediate frequency band (IF band). The RF front end 51 may—possibly together with further circuit components—be integrated into a chip, which is usually referred to as a monolithic microwave integrated circuit (MMIC).

The example illustrated shows a bistatic (or pseudo-monostatic) radar system with separate RX and TX antennas. In the case of a monostatic radar system, a single antenna would be used both to emit and to receive the electromagnetic (radar) signals. In this case, a directional coupler (for example a circulator) may be used to separate the RF signals to be emitted from the received RF signals (radar echo signals). Radar systems in practice usually have a plurality of transmission and reception channels (TX/RX channels) with a plurality of TX and RX antennas, which makes it possible, inter alia, to measure the direction (DoA) from which the radar echoes are received. In such multiple-input multiple-output (MIMO) systems, the individual TX channels and RX channels in each case usually have an identical or similar structure.

In the case of a frequency modulated continuous wave (FMCW) radar system, the RF signals emitted by the TX antenna 48 may be for example in the range of approximately 10 GHz to 1 THz. However, the frequency bands that are applied here depend on the structures to be used for the generation of the metamaterial target. As mentioned, the RF signal received by the RX antenna 49 comprises the radar echoes (chirp echo signals), that is to say those signal components that are backscattered at one or at a plurality of radar targets. The received RF signal is downmixed for example into baseband (or an IF band) and processed further in baseband by way of analog signal processing (see analog baseband signal processing chain 52).

The analog signal processing circuitry 52 essentially comprises filtering and possibly amplifying the baseband signal. The baseband signal is finally digitized (see analog-to-digital converter 53) and processed further in the digital domain. The digital signal processing chain may be implemented at least partly in the form of software that is able to be executed on a processor, for example a microcontroller, a digital signal processor (DSP) 54, or another computer unit.

The overall system is generally controlled by way of a system controller 55 that may likewise be implemented at least partly in the form of software that is able to be executed on a processor, such as for example a microcontroller. The RF front end 51 and the analog baseband signal processing chain 52 (optionally also the analog-to-digital converter 53) may be integrated together in a single MMIC (that is to say an RF semiconductor chip). As an alternative, the individual components may also be distributed over a plurality of integrated circuits.

The DSP 54 is configured to analyze a phase shift or an amplitude shift of one or more signals received from a mutually coupled structure to determine the applied torque. The DSP 54 is configured to perform the aforementioned phase analysis, amplitude analysis, and/or spectral analysis to determine an applied torque based on the determined amplitude modulation and/or phase modulation. The phase modulation of a received signal may be a phase shift of the received signal with respect to a phase of the transmitted mm-wave. Similarly, the amplitude modulation of a received signal may be an amplitude shift of the received signal with respect to an amplitude of the transmitted mm-wave. The DSP 54 may be configured to determine a phase shift and/or an amplitude shift of a received signal and translate the shift into an angular shift between tracks 45 and 46 resultant from the applied torque to calculate the applied torque or directly translate the phase shift and/or an amplitude shift to the applied torque. For example, the DSP 54 may refer to a look-up table provided in memory that stores torque values relative to a specific amplitude modulation and/or phase modulation.

In addition, the DSP 54 may receive signals from two different mutually coupled structures, calculate a differential measurement value from the signals, and determine the applied torque based on the differential measurement value, for example, by using a look-up table in which differential measurement values are correlated to different applied torques.

In addition, the DSP 54 may receive signals from reference tracks (e.g., reference tracks 45c and 46c), analyze an amplitude shift and/or a phase shift for each receive signal with respect to its corresponding transmitted signal, and determine an absolute angular position of each reference track as described herein. The DSP 54 may also calculate the rotational speed by analyzing the rate of change in the angular values. Additionally, by obtaining two measurement signals (e.g., two 90° phase shifted signals) for at least one of the reference tracks, a rotation direction of the rotatable target object may also be determined by the DSP 54. In general, two signals may be required to achieve a 360° unambiguous measurement range. For a system measuring in a limited range the property of the metamaterial must not necessarily be changed according to a sine/cosine system. For a limited range (e.g. +/−60°), a sine alone would be sufficient.

FIGS. 6A-6D are schematic views of various antenna configurations in a torque measurement system according to one or more embodiments. The antenna configurations may be used in any of the described embodiments, alone or in combination. The antenna configurations include transceivers 60a-60d, respectively, which use similar transmitter circuitry and receiver circuitry described in reference to transceiver 47.

Figure 6A:
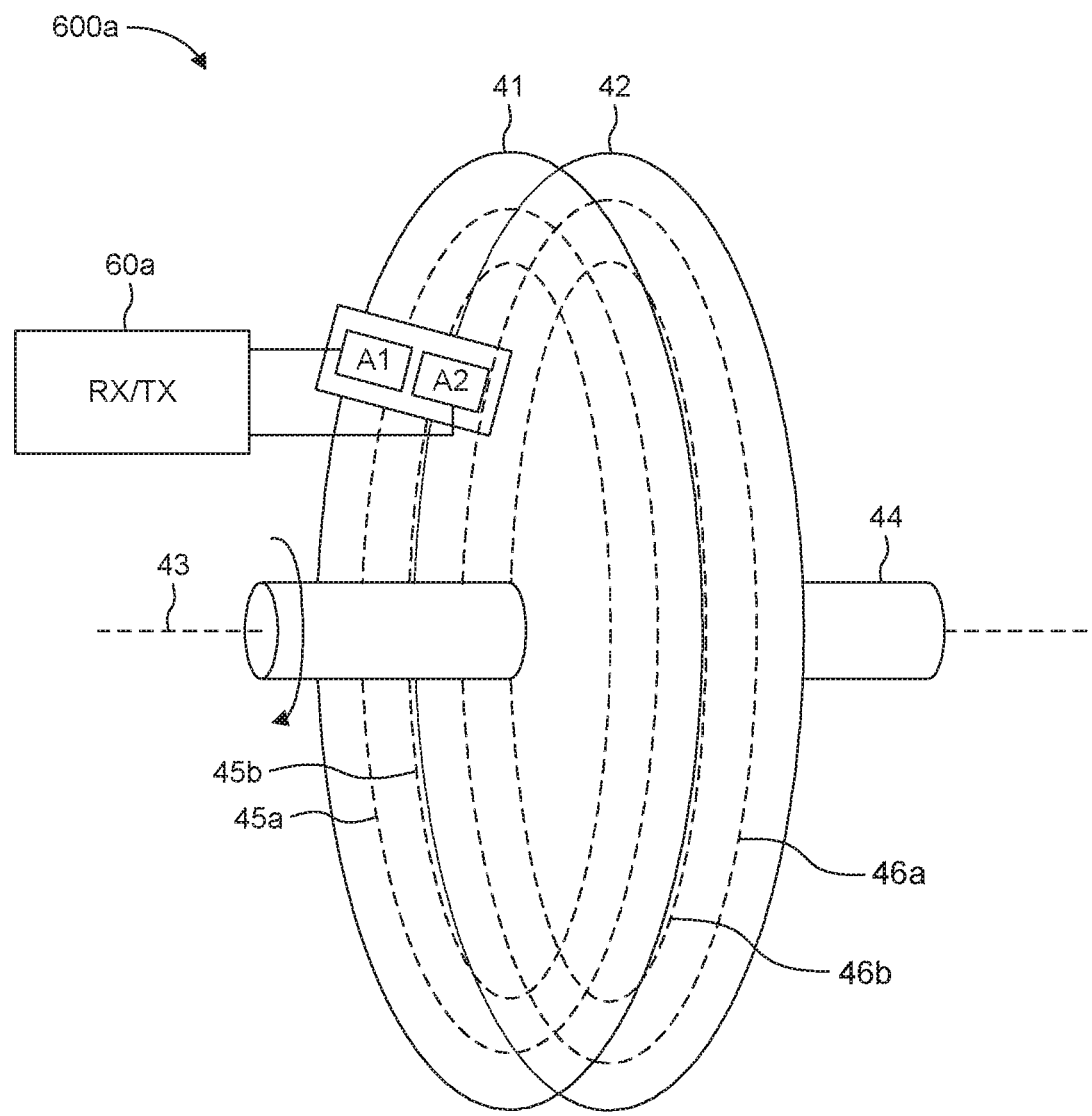
FIGS. 6A-6D are schematic views of various antenna configurations in a torque measurement system according to one or more embodiments.

In FIG. 6A, similar to the arrangement shown in FIG. 3B, the torque measurement system 600a includes a transceiver 60a electrically coupled to two antennas A1 and A2 that are arranged in proximity to (i.e., coupled to via a coupling effect) a respective metamaterial track 45a or 45b. In this case, each antenna A1 and A2 is configured to transmit a mm-wave beam and receive reflected mm-wave beams from its respective pair of mutually coupled metamaterial tracks to perform a measurement thereon. Thus, antenna A1 has a directional characteristic associated with tracks 45a and 46a, and antenna A2 has a directional characteristic associated with tracks 45b and 46b. The transceiver 60a includes a directional coupler in order to perform transmission and reception via a same antenna.

Figure 6B:
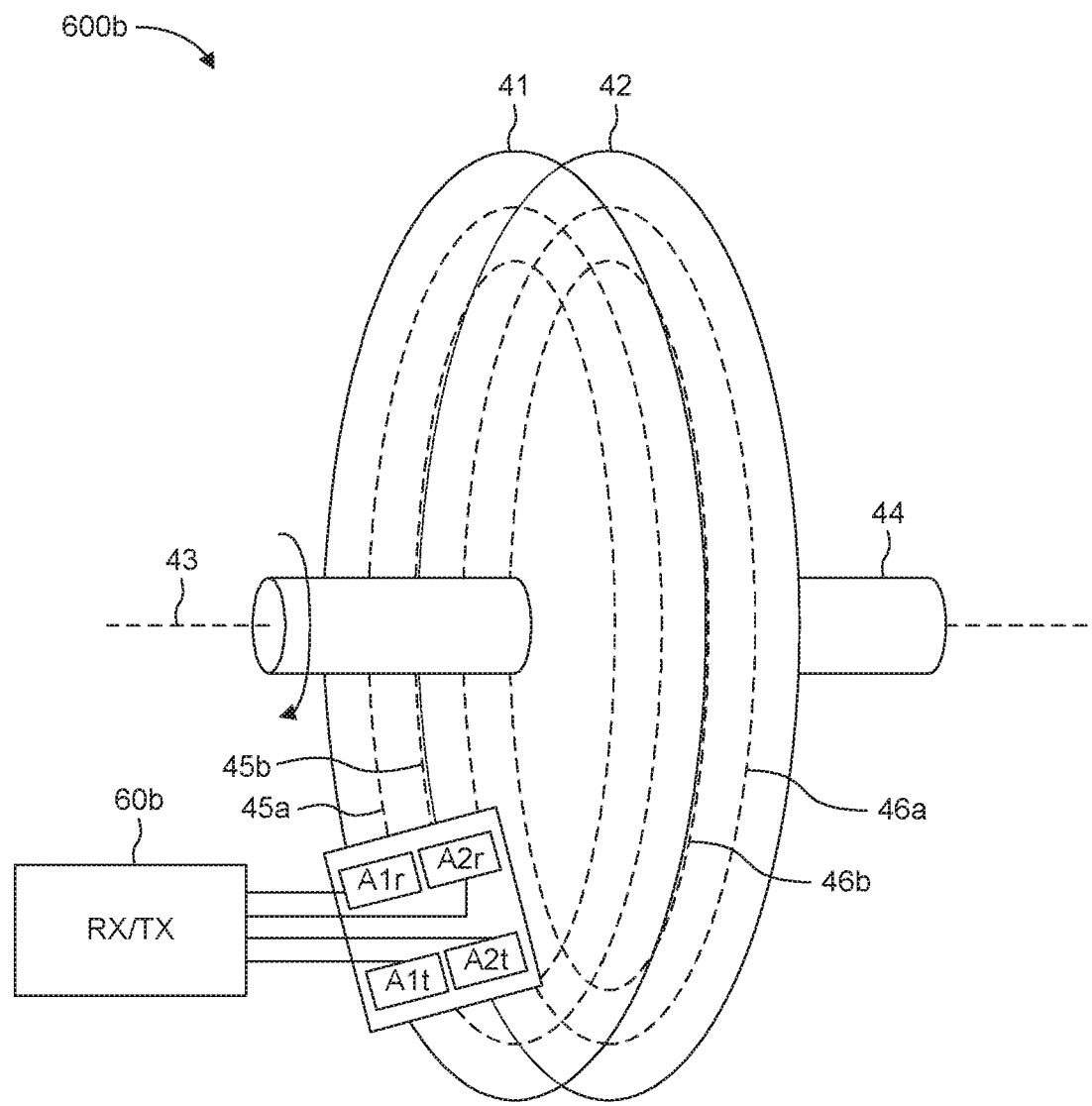

In FIG. 6B, the torque measurement system 600b includes a transceiver 60b electrically coupled to a pair of transmission antennas A1t-A2t and a pair of receiver antennas A1r-A2r (i.e., four antennas in all). This arrangement is similar to the arrangement shown in FIG. 6A, except separate antennas are used for transmitting and receiving mm-waves.

Figure 6C:
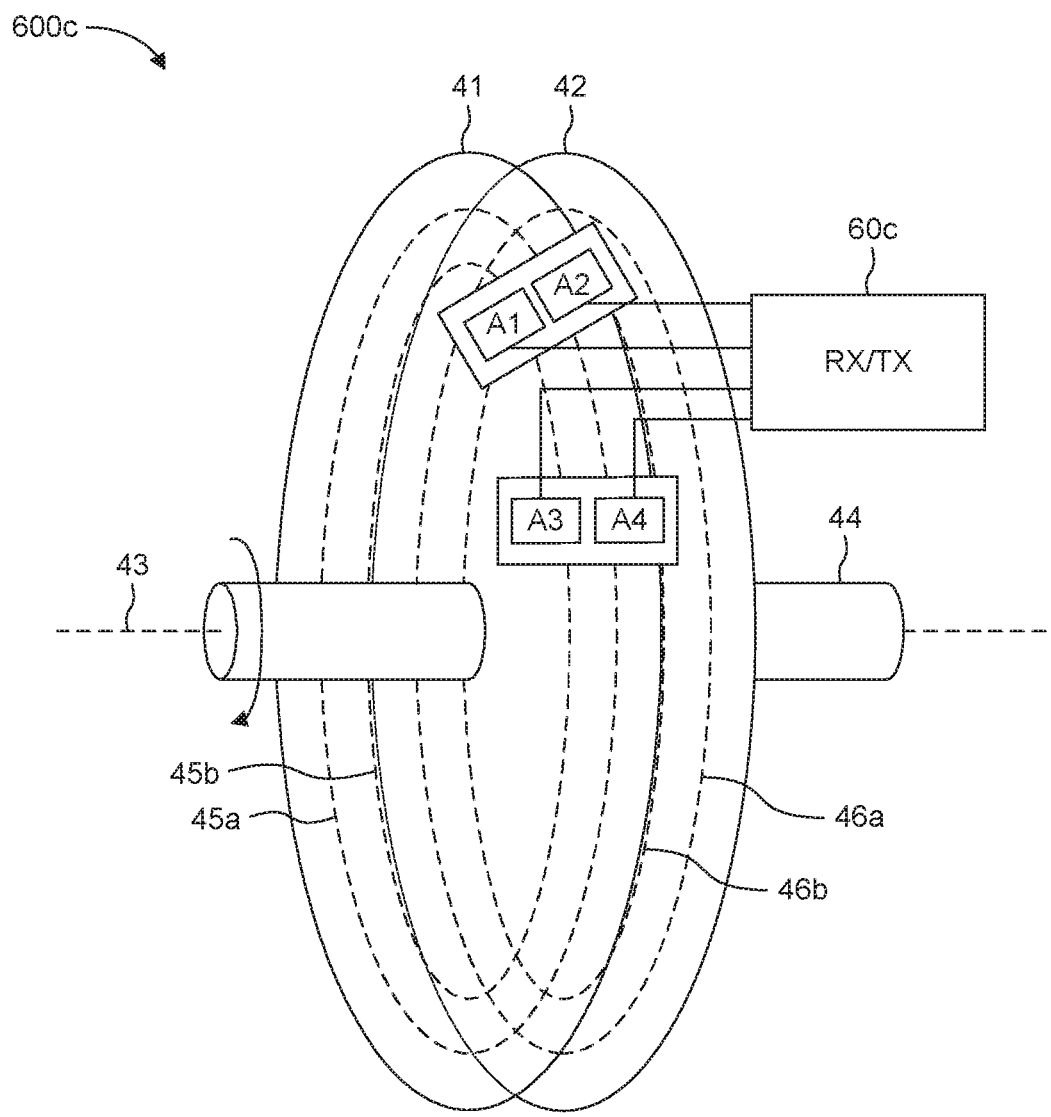

In FIG. 6C, the torque measurement system 600c includes a transceiver 60c electrically coupled to two pairs of antennas A1-A2 and A3-A4 (i.e., four antennas in all). Each antenna pair has one antenna arranged in proximity to (i.e., coupled to via a coupling effect) a respective metamaterial track 45a and 45b. Thus, two antennas (e.g., A1-A3 and A2-A4) are coupled to each mutually coupled structure. Antenna A1/A2 couple into their respective mutually coupled structure, which acts as a transmission line, and antennas A3/A4 couple the signal out again (at least partly).

As a result, antenna A1 transmits a signal into tracks 45b and 46b, tracks 45b and 46b, as a mutually coupled structure, act as a transmission line and transmit the signal along the mutually coupled structure, where antenna A3 picks up (i.e., couples out) the transmitted signal having an altered property due to the transmission along the mutually coupled structure.

Similarly, antenna A2 transmits a signal into tracks 45a and 46a, tracks 45a and 46a, as a mutually coupled structure, act as a transmission line and transmit the signal along the mutually coupled structure, where antenna A4 picks up (i.e., couples out) the transmitted signal having an altered property due to the transmission along the mutually coupled structure.

Thus, a transmitted signal couples into a respective mutually coupled structure which acts as transmission line and in a larger distance (i.e., several elementary metamaterial structure sizes) a receive antenna extracts a part of the energy from the respective mutually coupled structure.

Figure 6D:
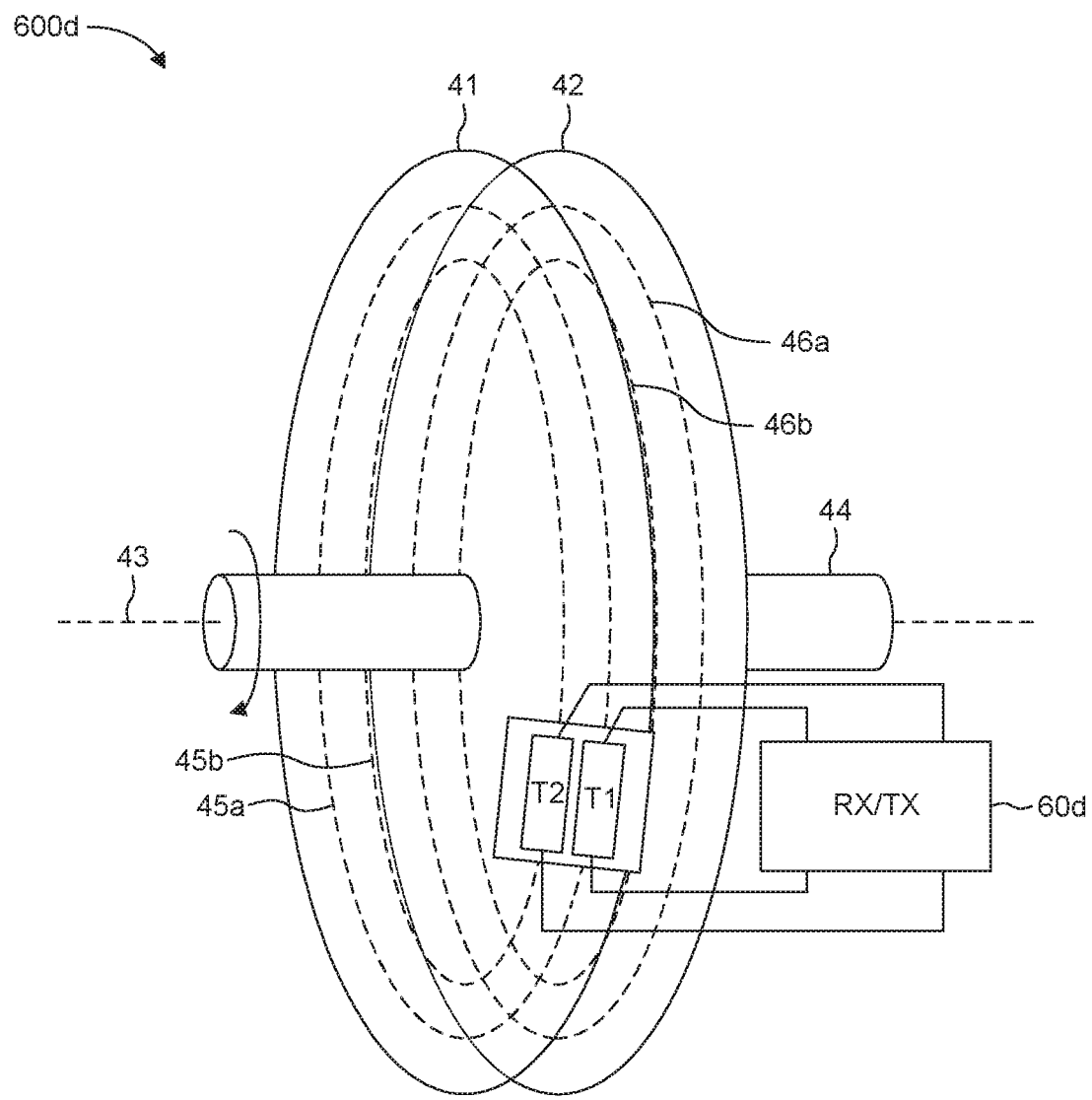

In FIG. 6D, the torque measurement system 600d includes a transceiver 60d electrically coupled to two transmission lines T1 and T2 that are each in proximity (i.e., coupled to via a coupling effect) a respective mutually coupled structure (i.e., mutually coupled structure 45a/46a or mutually coupled structure 45b/46b). The transmission lines T1 and T2 are substantially parallel with a segment of its respective mutually coupled structure. Transmission lines T1 and T2 carry an electromagnetic wave from the transceiver 60d and the respective mutually coupled structure is in the region of the electromagnetic field surrounding the transmission line (e.g., a plastic fiber). The torque dependent coupling effect between two mutually coupled tracks (i.e., tracks 45a/46a or tracks 45b/46b) influences the mm-wave impedance of the transmission line or partly couples energy out before it reaches the other end of the transmission line. This influence is unique to the angular displacement between the two carrier structures 41 and 42 and thereby corresponds to the applied torque.

Figure 7:
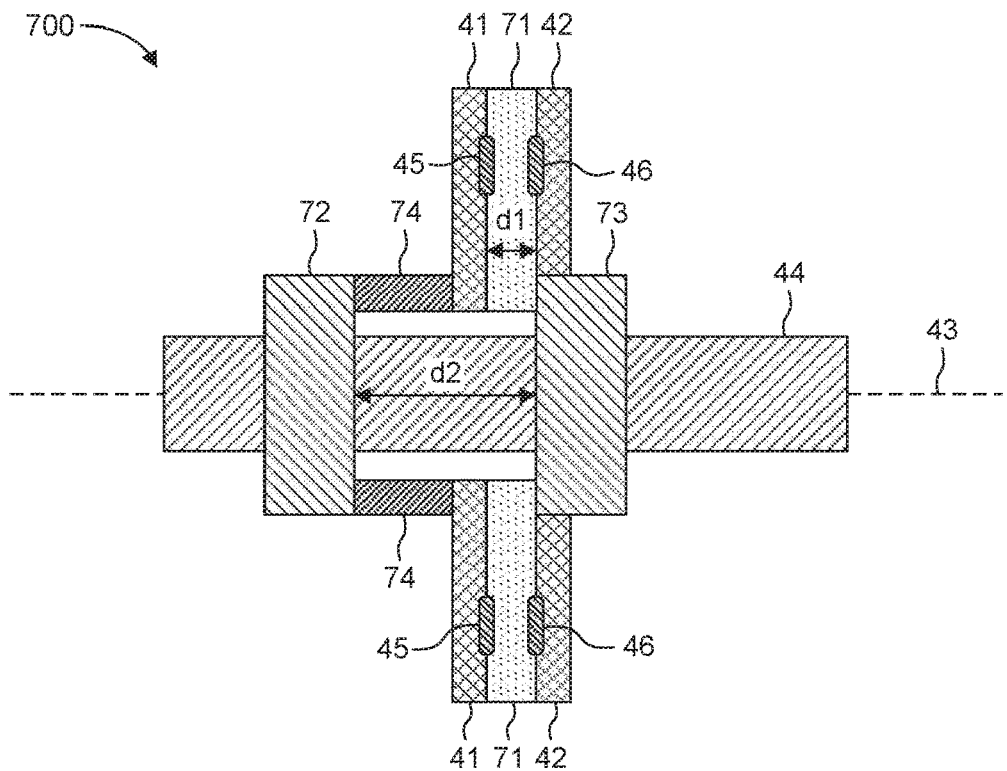
FIG. 7 is a cross-sectional view of a torque measurement system according to one or more embodiments.

FIG. 7 is a cross-sectional view of a torque measurement system 700 according to one or more embodiments. The torque measurement system 700 includes two carrier structures 41 and 42 fixed to a shift 44 at a predetermined distance apart as similarly described above. The torque measurement system 700 also includes two mutually coupled metamaterial tracks 45 and 46 as similarly described above. The structure of the torque measurement system 700 is fabricated to ensure alignment of the two tracks 45 and 46 as a predetermined distance apart such that the two tracks are ensured to have a certain position relation with each other and a desired mutual coupling therebetween is achieved.

Mechanically, two mutually coupled metamaterial tracks on different carrier structures have to be fixed to the shaft 44 with a certain distance, since the winding angle under an applied torque increases proportionally with respect to the length of the shaft between the two mutually coupled metamaterial tracks. On the other hand, the two mutually coupled metamaterial tracks need to be within a coupling distance. Furthermore, the mechanical arrangement has to fix the metamaterial tracks in a defined zero-torque starting position (i.e., a reference position) with respect to each other so that a change from the zero-torque starting position can be measured. Possible constructions are shown in FIGS. 7-10.

In FIG. 7, a flexible spacer 71 is interposed between the two carrier structures 41 and 42 and fixedly coupled (mechanically) thereto. The flexible spacer 71 defines the distance d1 between two carrier structures 41 and 41. Thus, the flexible spacer 71 also defines the distance d1 between the two tracks 41 and 42. Here, "flexible" means that the "torque resistance" or "stiffness" of the flexible spacer 71 is significantly lower than the torque resistance or stiffness of the shaft 44. For example, the shaft 44 may be made of steel and the flexible spacer 71 may be made of plastic (i.e., a material more flexible or less stiff than steel). Furthermore, the flexible spacer 71 may also be more flexible than the carrier structures to which it is mechanically coupled.

The flexible spacer 71 may be removed after assembly of each carrier structure onto the shaft.

The flexible spacer 71 may be replaced by a number of discrete space springs (e.g., small steel cantilevers) equally distributed around the circumference of the carrier structures 41 and 42. Thus, instead of a solid spacer material, local springs or pillars of spacer material may be distributed around the shaft. Thus, even if the flexible spacer 71 and the carrier structures are made of the same material or a material stiffer than the carrier structure, the flexible spacer 71 overall would be more flexible than the carrier structures due to it being made of local springs or pillars that increase the flexibility of the flexible spacer 71.

In addition, the torque measurement system 700 includes two fixtures 72 and 73 each configured to fixedly couple (mechanically) a corresponding carrier structure 41 or 42 to the shaft 44. Both fixtures 72 and 73 are mechanically coupled to the shaft 44 and represent a point of attachment of the carrier structures 41 and 42 to the shaft 44. As can be seen, fixture 73 fixedly couples (mechanically) carrier structure 42 directly to the shaft 44. Fixture 72 may also be used to fixedly couples (mechanically) carrier structure 41 directly to the shaft 44. However, in this example, an optional spacer ring 74 is used to fixedly couple (mechanically) the fixture 72 to the carrier structure 41. Each fixture 72 and 73 and the optional spacer ring 74 may be made of a stiff material, such as steel.

By using the optional spacer ring 74, a larger distance d2 on the shaft 44 is achieved at which the carrier structures 41 and 42 are attached. The larger distance d2 results in a larger angular shift between carrier structures as a result of an applied torque than if the carrier structures 41 and 42 were attached to the shaft 44 at the distance d1. The angular shift between carrier structures 41 and 42 is proportional to the lateral distance at which they are attached to the shaft 44. thus, the larger distance d2 causes a more pronounced angular shift between carrier structures 41 and 42. This in turn causes a larger shift in mm-wave properties in a receive signal detected at the receiver circuit that is easier to detect, measure, and translate into a torque value corresponding to the applied torque.

Figure 8:
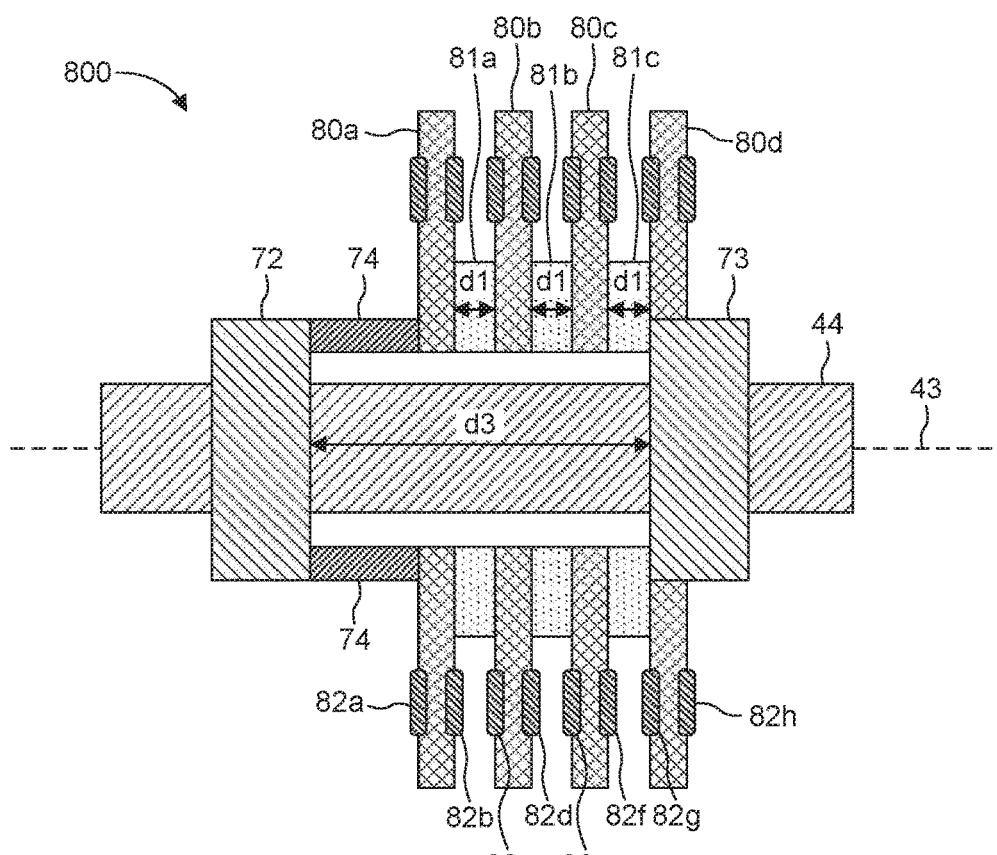
FIG. 8 is a cross-sectional view of another torque measurement system according to one or more embodiments.
Figure 9:
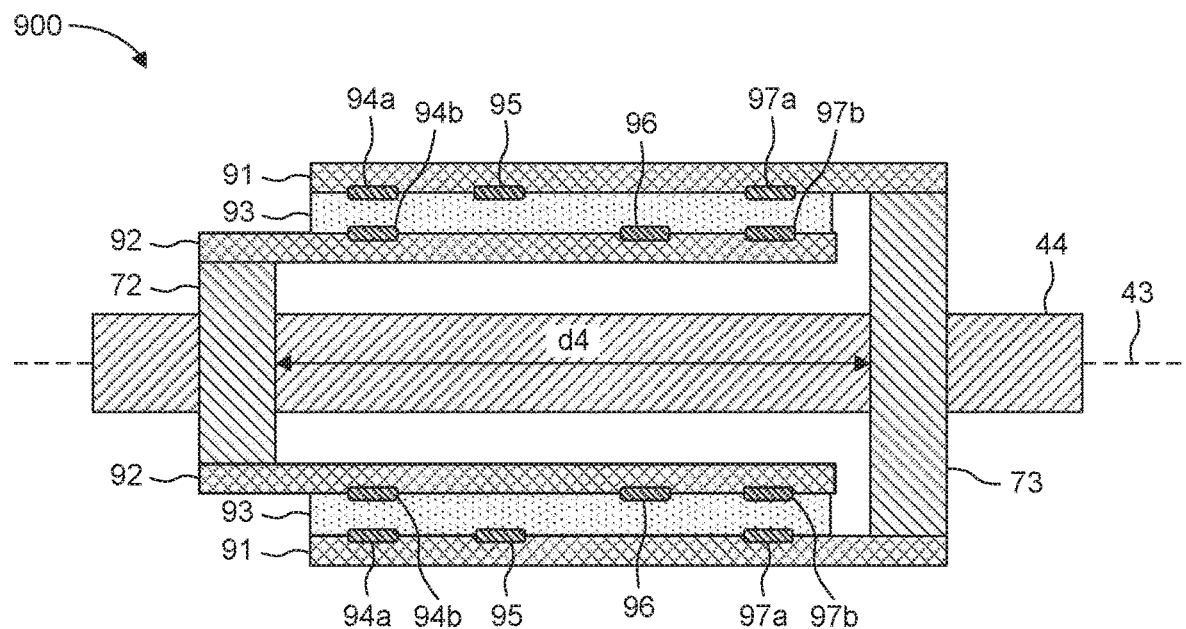
FIG. 9 is a cross-sectional view of another torque measurement system according to one or more embodiments.
Figure 10:
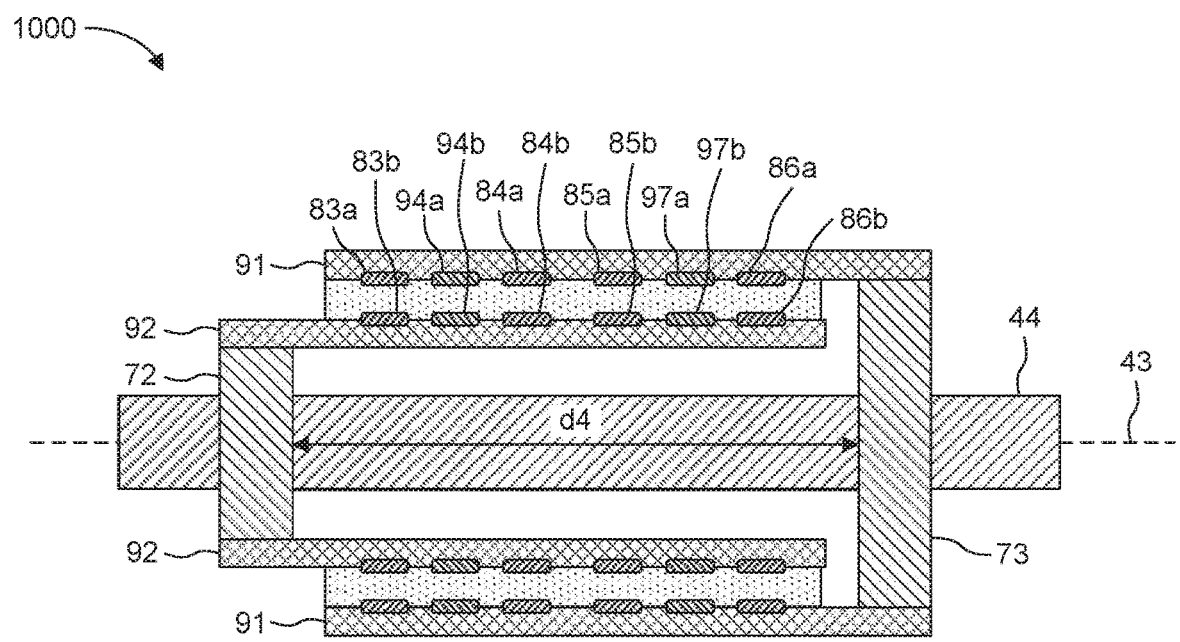
FIG. 10 is a cross-sectional view of another torque measurement system according to one or more embodiments.

FIGS. 8-10 provide additional variants to the construction. FIG. 8 is a cross-sectional view of a torque measurement system 800 according to one or more embodiments. The torque measurement system 800 includes multiple layers of carrier structures and flexible spacers. Here, the torque measurement system 800 includes four carrier structures 80a-80d fixed to a shift 44 at a predetermined distance apart from each other, which flexible spacers 81a-81c interposed between, respectively.

In addition, a pair of metamaterial tracks are attached to each carrier structure. Thus, eight metamaterial tracks 82a-82h are provided, where each track is mutually coupled to one or more neighboring tracks via a field effect.

As can be seen, the flexible spacers 81a-81c only extend to an inner diameter portion of the carrier structures 80a-80d and do not extend to an outer diameter portion of the carrier structures 80a-80d where the metamaterial tracks 82a-82h are located. Here, only air, which has no significant absorption or damping characteristic, is present between the metamaterial tracks 82a-82h.

Fixtures 72 and 73 are separated along the shaft 44 by a distance d3.

FIG. 9 is a cross-sectional view of a torque measurement system 900 according to one or more embodiments. In this case, the torque sensor structure may include nested cylinders 91 and 92 as carrier structures instead of discs with a flexible spacer 93 in-between. Carrier structure 91 is mechanically fixed to the shaft 44 by fixture 73 and carrier structure 92 is mechanically fixed to the shaft 44 by fixture 72, where fixtures 72 and 73 are separated along the shaft 44 by a distance d4.

The torque measurement system 900 additionally includes six metamaterial tracks 94a, 94b, 95, 96, 97a, and 97b. Tracks 94a and 94b represent a first mutually coupled structure that have a torque dependent mutual coupling due to a field effect acting thereon. Similarly, tracks 97a and 97b represent a second mutually coupled structure that have a torque dependent mutual coupling due to a field effect. The two mutually coupled structures are provided as redundant measurement channels for functional safety.

Tracks 95 and 96 are torque independent reference tracks for their respective carrier structure 91 and 92, and may be angle dependent or independent. Thus, tracks 95 and 96 are used in a similar manner described above in reference to tracks 45c and 46c. For example, track 95 may be used to measure a torque independent angular position of carrier structure 91 and track 96 may be used to measure a torque independent angular position of carrier structure 92.

FIG. 10 is a cross-sectional view of a torque measurement system 1000 according to one or more embodiments. The torque sensor structure of system 1000 has a similar construction to that shown in FIG. 9, except RF shields are provided on both sides of each mutually coupled structure. In particular, RF shields 83a, 83b, 84a, 84b, 85a, 85b, 86a, and 86b (i.e., isolation tracks) are provided in pairs and are each adjacent to a respective metamaterial track 94a, 94b, 97a, or 97b. The RF shields may be metal stripes that are used between the separate metamaterial tracks in order to create defined boundary conditions and to avoid crosstalk.

The RF shields may be created of the same metal layer as the metamaterial tracks 94a, 94b, 97a, and 97b but are unstructured (i.e., devoid of elementary structures) or are differently structured from the metamaterial tracks 94a, 94b, 97a, and 97b with elementary structures that have a resonance substantially different from the resonance of the elementary structures of metamaterial tracks 94a, 94b, 97a, and 97b such that the RF shields isolate the two mutually coupled structures from each other. For example, the RF shields may be made up of elementary structures that are highly absorptive (i.e., 80% absorptive or greater) with respect to mm-waves and the metamaterial tracks 94a, 94b, 97a, and 97b may be made up of elementary structures that a highly reflective (i.e., 80% reflectivity or greater) with respect to mm-waves, or vice versa. Thus, the RF shields insulate the two mutually coupled structures from each other.

While the examples provide use discs and cylinders, any other geometry may be used to carry the metamaterial structures, such as bladders. Also, even if planar structures appear to be the most attractive solutions for production cost from today's point of view, the metamaterial between the carrier discs or carrier cylinders need not be planar but may be a 3D structured metamaterial that is deformed depending on the applied torque.

Further, while various embodiments have been described, it will be apparent to those of ordinary skill in the art that many more embodiments and implementations are possible within the scope of the disclosure. Accordingly, the invention is not to be restricted except in light of the attached claims and their equivalents. With regard to the various functions performed by the components or structures described above (assemblies, devices, circuits, systems, etc.), the terms (including a reference to a "means") used to describe such components are intended to correspond, unless otherwise indicated, to any component or structure that performs the specified function of the described component (i.e., that is functionally equivalent), even if not structurally equivalent to the disclosed structure that performs the function in the exemplary implementations of the invention illustrated herein.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure. Such hardware, software, and firmware may be implemented within the same device or within separate devices to support the various techniques described in this disclosure.

Although various exemplary embodiments have been disclosed, it will be apparent to those skilled in the art that various changes and modifications can be made which will achieve some of the advantages of the concepts disclosed herein without departing from the spirit and scope of the invention. It will be obvious to those reasonably skilled in the art that other components performing the same functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

What is claimed is:

1. A torque measurement system, comprising:
a first rotatable carrier structure mechanically coupled to a rotational shaft and configured to rotate about a rotational axis in a rotation direction;
a second rotatable carrier structure mechanically coupled to the rotational shaft and configured to rotate about the rotational axis in the rotation direction, wherein the second rotatable carrier structure is spaced apart from the first rotatable carrier structure;
a first metamaterial track coupled to the first rotatable carrier structure, wherein the first metamaterial track is arranged outside of the rotational axis, and wherein the first metamaterial track comprises a first array of elementary structures;
a second metamaterial track coupled to the second rotatable carrier structure, wherein the second metamaterial track is arranged outside of the rotational axis, and wherein the second metamaterial track comprises a second array of elementary structures,
wherein the first metamaterial track and the second metamaterial track are mutually coupled to each other by a first torque dependent coupling, thereby forming a first mutually coupled structure;
at least one transmitter configured to transmit a first electro-magnetic transmit signal towards the first mutually coupled structure, wherein the first mutually coupled structure is arranged to convert the first electro-magnetic transmit signal into a first electro-magnetic receive signal based on a torque applied to the rotational shaft; and
at least one receiver configured to receive the first electro-magnetic receive signal.

2. The torque measurement system of claim 1, wherein the first metamaterial track and the second metamaterial track are spaced apart by a first predetermined distance.

3. The torque measurement system of claim 2, wherein:
the first rotatable carrier structure mechanically is coupled to the rotational shaft at a first point of attachment and the second rotatable carrier structure mechanically is coupled to the rotational shaft at a second point of attachment, and
the first point of attachment and the second point of attachment are spaced apart by a second predetermined distance that is greater than the first predetermined distance.

4. The torque measurement system of claim 2, further comprising:
a flexible spacer interposed between the first rotatable carrier structure and the second rotatable carrier structure, wherein the flexible spacer defines the first predetermined distance.

5. The torque measurement system of claim 1, wherein the first torque dependent coupling affects an mm-wave property of the first mutually coupled structure such that the mm-wave property changes based on the torque applied to the rotational shaft.

6. The torque measurement system of claim 5, wherein the first torque dependent coupling includes at least one of capacitive near field coupling, inductive near field coupling, waveguide coupling, or far field coupling.

7. The torque measurement system of claim 5, wherein:
the first mutually coupled structure is configured to modify the first electro-magnetic transmit signal based on the first torque dependent coupling, thereby producing the first electro-magnetic receive signal having a first property unique to the torque applied to the rotational shaft, and
the torque measurement system further comprises at least one processor configured to determine the torque applied to the rotational shaft based on the received first electro-magnetic receive signal,
wherein the at least one processor is configured to evaluate the first property of the received first electro-magnetic receive signal, and determine the torque applied to the rotational shaft based on the evaluated first property.

8. The torque measurement system of claim 1, wherein, in response to the torque applied to the rotational shaft, the first metamaterial track and the second metamaterial track are configured to rotate about the rotational axis by differing amounts causing a torque dependent shift in angular position between the first metamaterial track and the second metamaterial track and resulting in a torque dependent change to the first torque dependent coupling.

9. The torque measurement system of claim 1, wherein:
the first metamaterial track is arranged at least partially around the rotational axis and a coupling effect between elementary structures of the first array of elementary structures is constant around a perimeter of the first metamaterial track, and
the second metamaterial track is arranged at least partially around the rotational axis and a coupling effect between elementary structures of the second array of elementary structures is constant around a perimeter of the second metamaterial track.

10. The torque measurement system of claim 1, wherein:
the first mutually coupled structure is configured to convert the first electro-magnetic transmit signal into the first receive signal based on the first torque dependent coupling by at least one of partial reflection or partial absorption, and
the first electro-magnetic receive signal is either a partially-reflected signal of the first transmit signal that is reflected by the first mutually coupled structure or a partially-transmitted signal of the first transmit signal that passes through the first mutually coupled structure.

11. The torque measurement system of claim 1, further comprising:
at least one processor configured to determine the torque applied to the rotational shaft based on the received first electro-magnetic receive signal.

12. The torque measurement system of claim 11, wherein:
the receiver is configured to demodulate the received first electro-magnetic receive signal to generate a demodulated signal, and
the at least one processor is configured to evaluate a property of the received first electro-magnetic receive signal using at least one of phase analysis, amplitude analysis, or spectral analysis, and determine the torque applied to the rotatable shaft based on the evaluated property.

13. The torque measurement system of claim 1, further comprising:
a third metamaterial track coupled to the first rotatable carrier structure, wherein the third metamaterial track is arranged around the rotational axis, and wherein the third metamaterial track comprises a third array of elementary structures,
wherein the at least one transmitter is configured to transmit a second electro-magnetic transmit signal at the third metamaterial track, wherein the third metamaterial track is arranged to convert the second electro-magnetic transmit signal into a second electro-magnetic receive signal,
the at least one receiver is configured to receive the second electro-magnetic receive signal.

14. The torque measurement system of claim 13, wherein:
the third metamaterial track is configured to modify the second electro-magnetic transmit signal, thereby producing the second electro-magnetic receive signal having a property unique to an angular position of the third metamaterial track at which the second electro-magnetic transmit signal is incident, and
the torque measurement system further comprises at least one processor configured to evaluate the property of the received second electro-magnetic receive signal, and determine a first rotational position of the first rotatable carrier structure based on the evaluated property.

15. The torque measurement system of claim 13, further comprising:
at least one processor configured to determine a first position change of the first rotatable carrier structure based on the second electro-magnetic receive signal.

16. The torque measurement system of claim 15, further comprising:
a fourth metamaterial track coupled to the second rotatable carrier structure, wherein the fourth metamaterial track is arranged around the rotational axis, and wherein the fourth metamaterial track comprises a fourth array of elementary structures,
wherein the at least one transmitter is configured to transmit a third electro-magnetic transmit signal at the fourth metamaterial track, wherein the fourth metamaterial track is arranged to convert the third electro-magnetic transmit signal into a third electro-magnetic receive signal,
the at least one receiver is configured to receive the third electro-magnetic receive signal, and
the at least one processor is configured to determine a second position change of the second rotatable carrier structure based on the third electro-magnetic receive signal.

17. The torque measurement system of claim 16, wherein the at least one processor is further configured to determine a change of a rotational difference between the first rotatable carrier structure and the second rotatable carrier structure based on the first position change and the second position change.

18. The torque measurement system of claim 17, wherein:
the at least one processor is configured to determine the torque applied to the rotational shaft based on the determined rotational difference.

19. The torque measurement system of claim 1, further comprising:
a third metamaterial track coupled to the first rotatable carrier structure, wherein the third metamaterial track is arranged around the rotational axis, and wherein the third metamaterial track comprises a third array of elementary structures; and
a fourth metamaterial track coupled to the second rotatable carrier structure, wherein the fourth metamaterial track is arranged around the rotational axis, and wherein the fourth metamaterial track comprises a fourth array of elementary structures,
wherein the third metamaterial track and the fourth metamaterial track are mutually coupled to each other by a second torque dependent coupling, thereby forming a second mutually coupled structure,
wherein the at least one transmitter is configured to transmit a second electro-magnetic transmit signal towards the second mutually coupled structure, wherein the second mutually coupled structure is arranged to convert the second electro-magnetic transmit signal into a second electro-magnetic receive signal based on the torque applied to the rotational shaft,
wherein the at least one receiver is configured to receive the second electro-magnetic receive signal; and
at least one processor configured to determine the torque applied to the rotational shaft based on the received first electro-magnetic receive signal and the received second electro-magnetic receive signal.

20. The torque measurement system of claim 19, further comprising:
at least one first isolation track coupled to the first rotatable carrier structure and interposed between the first metamaterial track and the third metamaterial track, wherein the at least one first isolation track is configured to isolate the first metamaterial track from the third metamaterial track; and
at least one second isolation track coupled to the second rotatable carrier structure and interposed between the second metamaterial track and the fourth metamaterial track, wherein the at least one second isolation track is configured to isolate the second metamaterial track from the fourth metamaterial track.

21. The torque measurement system of claim 1, wherein the first electro-magnetic transmit signal and the first electro-magnetic receive signal are electro-magnetic signals having wavelengths that reside in an electromagnetic spectrum.

22. The torque measurement system of claim 1, wherein the first electro-magnetic transmit signal and the first electro-magnetic receive signal are electromagnetic millimeter waves having frequencies in a millimeter frequency band.

23. The torque measurement system of claim 1, wherein the first array of elementary structures are arranged in a first grid array having first rows and first columns and the second array of elementary structures are arranged in a second grid array having second rows and second columns.

24. The torque measurement system of claim 1, wherein:
the first array of elementary structures are coupled to each other via at least one of capacitive coupling or inductive coupling, and
the second array of elementary structures are coupled to each other via at least one of capacitive coupling or inductive coupling.

25. A method of determining a torque applied to a rotatable shaft, the method comprising:
transmitting a first electro-magnetic transmit signal towards a first mutually coupled structure mechanically coupled to the rotatable shaft,
converting, by the first mutually coupled multitrack structure, the first electro-magnetic transmit signal into a first electro-magnetic receive signal;
receiving the first electro-magnetic receive signal, wherein the first electro-magnetic transmit signal and the first electro-magnetic receive signal are electro-magnetic wave signals;
evaluating the received first electro-magnetic receive signal; and
determining the torque applied to the rotatable shaft based on the evaluated first electro-magnetic receive signal.

26. The method of claim 25, wherein:
the first electro-magnetic receive signal has a first property depending on an amount of the torque applied to the rotatable shaft,
evaluating the received first electro-magnetic receive signal comprises evaluating the first property of the received first electro-magnetic receive signal, and
determining the torque applied to the rotatable shaft comprises determining the torque applied to the rotatable shaft based on the evaluated first property.

27. The method of claim 25, wherein:
the first mutually coupled structure comprises a first metamaterial track arranged outside of a rotational axis about which the rotatable shaft rotates and a second metamaterial track arranged outside the rotational axis and spaced apart from the first metamaterial track, and
the first metamaterial track and the second metamaterial track are mutually coupled to each other by a first torque dependent coupling, thereby forming the first mutually coupled structure.

28. The method of claim 27, wherein the first torque dependent coupling affects an mm-wave property of the first mutually coupled structure such that the mm-wave property changes based on the torque applied to the rotational shaft.

29. The method of claim 27, wherein:
converting the first electro-magnetic transmit signal into the first electro-magnetic receive signal comprises modifying the first electro-magnetic transmit signal based on the first torque dependent coupling, thereby producing the first electro-magnetic receive signal having a first property unique to the torque applied to the rotational shaft,
evaluating the received first electro-magnetic receive signal comprises evaluating the first property of the received first electro-magnetic receive signal, and
determining the torque applied to the rotational shaft comprises determining the torque applied to the rotational shaft based on the evaluated first property.

30. The method of claim 29, wherein evaluating the received first electro-magnetic receive signal comprises demodulating the received first electro-magnetic receive signal to generate a demodulated signal, and evaluating the first property of the demodulated signal using at least one of phase analysis, amplitude analysis, or spectral analysis.

* * * * *